United States Patent
Payne et al.

(10) Patent No.: US 11,455,465 B2
(45) Date of Patent: *Sep. 27, 2022

(54) BOOK ANALYSIS AND RECOMMENDATION

(71) Applicant: Booxby Inc., Sausalito, CA (US)

(72) Inventors: Holly Lynn Payne, Mill Valley, CA (US); Mark Fielding Bregman, San Francisco, CA (US); Bogart Vargas, Austin, TX (US); Thamar Solorio, Houston, TX (US); Suraj Maharjan, Houston, TX (US); Sudipta Kar, Houston, TX (US)

(73) Assignee: Booxby Inc., Sausalito, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 16/678,553

(22) Filed: Nov. 8, 2019

(65) Prior Publication Data

US 2020/0097538 A1 Mar. 26, 2020

Related U.S. Application Data

(63) Continuation of application No. 15/782,367, filed on Oct. 12, 2017, now Pat. No. 10,503,829.

(Continued)

(51) Int. Cl.
*G06F 40/253* (2020.01)
*G06N 20/00* (2019.01)
(Continued)

(52) U.S. Cl.
CPC ...... *G06F 40/253* (2020.01); *G06F 16/24578* (2019.01); *G06F 16/35* (2019.01);
(Continued)

(58) Field of Classification Search
CPC ............. G06F 40/253; G06F 16/24578; G06F 16/2457; G06F 16/35; G06F 16/383;
(Continued)

(56) References Cited

U.S. PATENT DOCUMENTS

| | | | |
|---|---|---|---|
| 2014/0279756 A1* | 9/2014 | Whitman | G06F 16/735 707/771 |
| 2015/0006258 A1* | 1/2015 | Salama | G06Q 10/00 705/7.35 |
| 2015/0154179 A1* | 6/2015 | Allen | G06F 40/30 704/9 |

OTHER PUBLICATIONS

Ashok, V. et al., "Success with Style: Using Writing Style to Predict the Success of Novels," Proceedings of the 2013 Conference on Empirical Methods in Natural Language Processing, Seattle, Washington, Oct. 18, 2013, pp. 1753-1764.

(Continued)

*Primary Examiner* — Huyen X Vo
(74) *Attorney, Agent, or Firm* — RMCK Law Group PLC

(57) ABSTRACT

A method includes generating style values and experiential language tags (ELTs) for a plurality of books based on retrieved book content and reader reviews, respectively. The method further includes generating an ELT prediction model based on the style values and the ELTs. The ELT prediction model is configured to receive a set of style values for a new book and output a set of predicted ELTs for the new book, the set of predicted ELTs indicating predicted reader experiences with the new book. The method further includes receiving user-submitted book content from a remote user device, determining style values for the user-submitted book content, and determining a list of predicted ELTs for the user-submitted book content using the style values for the user-submitted book content and the ELT prediction model. Additionally, the method includes transmitting, to the user device, the list of predicted ELTs for the user-submitted book content.

20 Claims, 16 Drawing Sheets

Related U.S. Application Data

(60) Provisional application No. 62/407,657, filed on Oct. 13, 2016.

(51) Int. Cl.
| | |
|---|---|
| *G06F 16/93* | (2019.01) |
| *G06F 16/2457* | (2019.01) |
| *G06F 16/9536* | (2019.01) |
| *G06F 16/383* | (2019.01) |
| *G06F 16/9535* | (2019.01) |
| *G06Q 30/02* | (2012.01) |
| *G06N 5/04* | (2006.01) |
| *G06Q 30/06* | (2012.01) |
| *G06F 16/35* | (2019.01) |
| *G06F 40/30* | (2020.01) |
| *G06F 40/56* | (2020.01) |
| *G06F 40/205* | (2020.01) |
| *G06F 40/242* | (2020.01) |
| *G06N 5/00* | (2006.01) |
| *G06N 20/20* | (2019.01) |
| *G06N 3/04* | (2006.01) |
| *G06N 20/10* | (2019.01) |

(52) U.S. Cl.
CPC ............ *G06F 16/383* (2019.01); *G06F 16/94* (2019.01); *G06F 16/9535* (2019.01); *G06F 16/9536* (2019.01); *G06F 40/205* (2020.01); *G06F 40/242* (2020.01); *G06F 40/30* (2020.01); *G06F 40/56* (2020.01); *G06N 5/04* (2013.01); *G06N 20/00* (2019.01); *G06Q 30/0241* (2013.01); *G06Q 30/0251* (2013.01); *G06Q 30/0631* (2013.01); *G06N 3/0454* (2013.01); *G06N 5/003* (2013.01); *G06N 20/10* (2019.01); *G06N 20/20* (2019.01)

(58) Field of Classification Search
CPC ........ G06F 16/94; G06F 40/134; G06F 16/93; G06F 16/9535; G06F 16/9536; G06F 40/205; G06F 40/242; G06F 40/30; G06F 40/56; G06N 5/04; G06N 20/00; G06N 3/0454; G06N 3/04; G06N 5/003; G06N 5/00; G06N 20/10; G06N 20/20; G06Q 30/0241; G06Q 30/02; G06Q 30/0251; G06Q 30/0631; G06Q 30/06
See application file for complete search history.

(56) References Cited

OTHER PUBLICATIONS

BISG (Book Industry Study Group), BISAC Subject Codes FAQ, https://web.archive.Org/web/20160720110751/http://bisg.org/page/BISACFaQ, Website dated Jul. 20, 2016 on archive.org, accessed on Jan. 24, 2018, 11 pages.

Fitzpatrick, J., "Which Book Will Help Fill Your Reading List," https://lifehacker.com/5111262/whichbook-will-help-fill-your-reading-list, Dec. 20, 2008, 1 page.

MacDonald, M., "BookLamp and Whichbook: Two Solutions to the Online Book Recommendation Problem," Booknetcanada.ca article, https://www.booknetcanada.ca/blog/2011/7/21/booklamp-and-whichbook-two-solutions-to-the-online-book-reco.html, Jul. 21, 2011, pp. 1-3.

Messieh, N. "7+ Sites To Help You Decide Which Book To Read Next," https://www.makeuseof.com/tag/7-sites-decide-book-read/, May 2, 2011, pp. 1-9.

Wikipedia article: Item-item collaborative filtering, https://web.archive.org/web/20160801012331/https://en.wikipedia.org/wiki/Item-item_collaborative_filtering, Website Dated Aug. 1, 2016 on archive.org., accessed on Jan. 24, 2018, 2 pages.

* cited by examiner

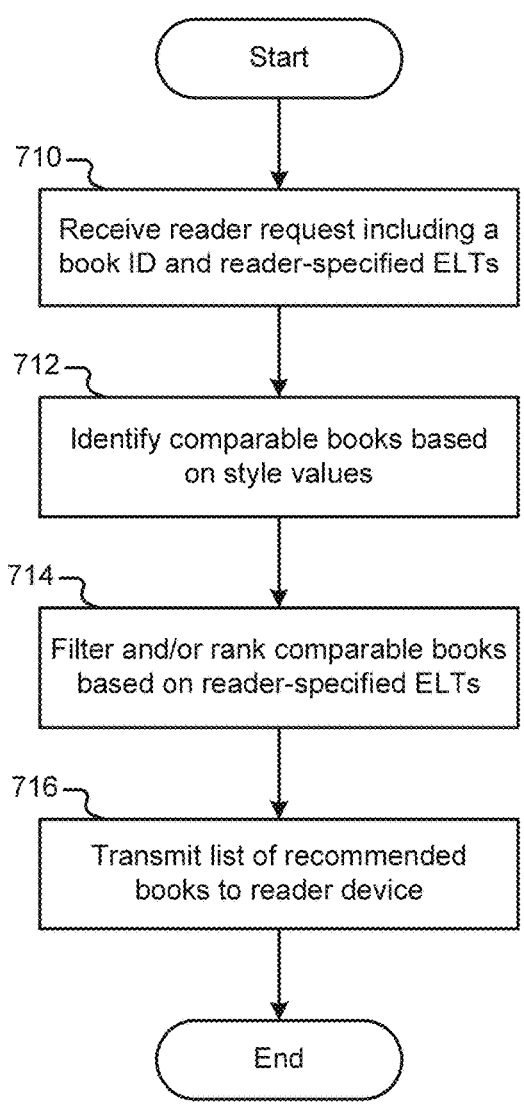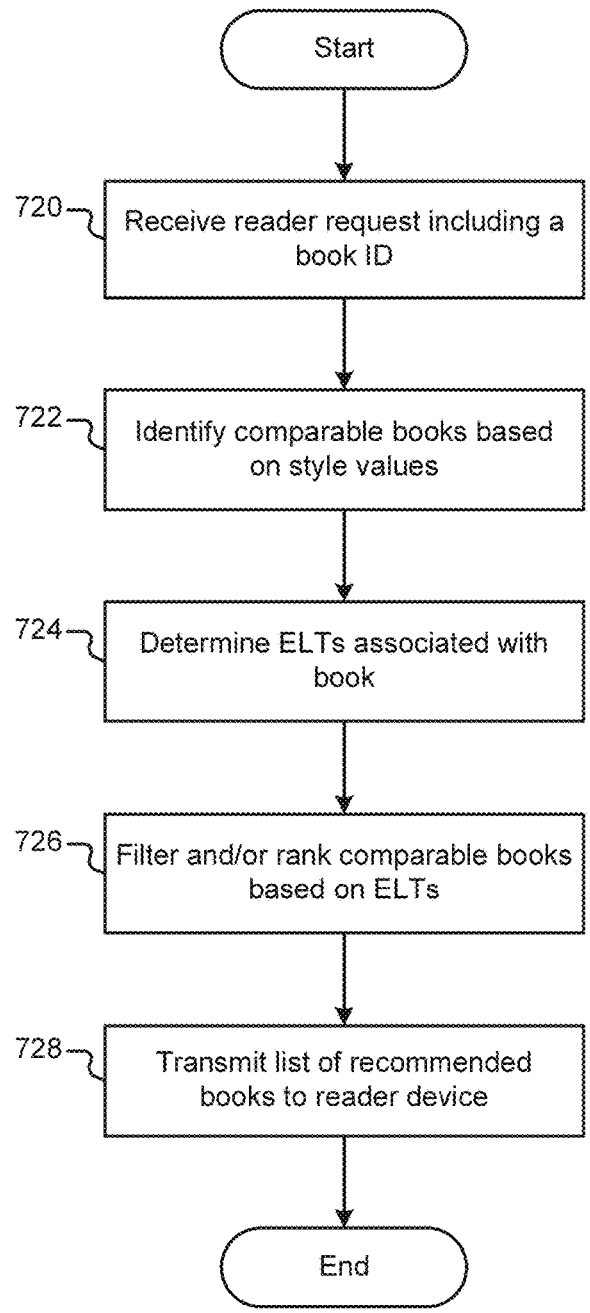
FIG. 7B
FIG. 7C

BOOK ANALYSIS AND RECOMMENDATION

CROSS-REFERENCE TO RELATED APPLICATIONS

This application is a continuation of U.S. patent application Ser. No. 15/782,367, filed on Oct. 12, 2017. This application also claims the benefit of U.S. Provisional Application No. 62/407,657, filed on Oct. 13, 2016. The disclosures of the above applications are incorporated herein by reference in their entirety.

GOVERNMENT LICENSE RIGHTS

Subject matter described herein was developed at least in part with United States Government support via National Science Foundation (NSF) Award No. (FAIN) 1549549. The United States Government may have rights in this invention

FIELD

This disclosure relates to techniques for analyzing literary content and providing content recommendations to readers.

BACKGROUND

Publishing pipelines can include a variety of different parties involved in creating, producing, and distributing content in multiple media formats (e.g., printed/digital formats). Example content can include books, articles, and television/films. In book publishing, authors create book content that may be produced, marketed, and distributed by other parties, such as agents, publishers, and distributors. These parties may invest time and resources in targeting readers for advertising and distribution so that the readers discover and purchase their published books. For example, the parties may advertise to readers via a variety of different channels, such as commercial websites/applications, book review sites/applications, and social media websites/applications. In some cases, readers may discover books via targeted advertising on such channels. Additionally, or alternatively, readers may discover and evaluate books via searches (e.g., based on author or genre) and reader-generated content (e.g., reader reviews and/or ratings) on such channels.

SUMMARY

In one example, the present disclosure is directed to a method comprising retrieving book content and reader reviews for a plurality of books, the book content for each book including an author's written portion of the book. The method further comprises generating style values for each of the plurality of books based on the retrieved book content, the style values for each book indicating the author's writing style for the book. The method further comprises generating experiential language tags (ELTs) for each of the plurality of books based on the retrieved reader reviews, the ELTs for each book indicating one or more readers' experiences with the book. Additionally, the method comprises generating an ELT prediction model based on the style values and the ELTs for the plurality of books. The ELT prediction model is configured to receive a set of style values for a new book and output a set of predicted ELTs for the new book, the set of predicted ELTs indicating predicted reader experiences with the new book. The method further comprises receiving user-submitted book content from a remote user device, determining style values for the user-submitted book content, and determining a list of predicted ELTs for the user-submitted book content using the style values for the user-submitted book content and the ELT prediction model. Additionally, the method comprises transmitting, to the user device, the list of predicted ELTs for the user-submitted book content.

In another example, the present disclosure is directed to a system comprising a book data store and one or more computing devices. The book data store is configured to store a plurality of book records for a plurality of books. The one or more computing devices are configured to retrieve book content and reader reviews for the plurality of books, the book content for each book including an author's written portion of the book. The one or more computing devices are configured to generate style values for each of the plurality of books based on the retrieved book content, the style values for each book indicating the author's writing style for the book. The one or more computing devices are configured to generate ELTs for each of the plurality of books based on the retrieved reader reviews, the ELTs for each book indicating one or more readers' experiences with the book. Additionally, the one or more computing devices are configured to store the generated style values and generated ELTs in the book records and generate an ELT prediction model based on the style values and ELTs for the plurality of books. The ELT prediction model is configured to receive a set of style values for a new book and output a set of predicted ELTs for the new book, the set of predicted ELTs indicating predicted reader experiences with the new book. The one or more computing devices are configured to receive user-submitted book content from a remote user device, determine style values for the user-submitted book content, and determine a list of predicted ELTs for the user-submitted book content using the style values for the user-submitted book content and the ELT prediction model. Additionally, the one or more computing devices are configured to transmit, to the user device, the list of predicted ELTs for the user-submitted book content.

In another example, the present disclosure is directed to a computer-readable medium storing a set of computer-executable instructions, the computer-executable instructions causing a processing unit of a computing device to retrieve book content and reader reviews for a plurality of books, the book content for each book including an author's written portion of the book. The processing unit is further configured to generate style values for each of the plurality of books based on the retrieved book content, the style values for each book indicating the author's writing style for the book. The processing unit is further configured to generate ELTs for each of the plurality of books based on the retrieved reader reviews, the ELTs for each book indicating one or more readers' experiences with the book. Additionally, the processing unit is configured to generate an ELT prediction model based on the style values and ELTs for the plurality of books. The ELT prediction model is configured to receive a set of style values for a new book and output a set of predicted ELTs for the new book, the set of predicted ELTs indicating predicted reader experiences with the new book. The processing unit is configured to receive user-submitted book content from a remote user device, determine style values for the user-submitted book content, and determine a list of predicted ELTs for the user-submitted book content using the style values for the user-submitted book content and the ELT prediction model. Additionally, the processing unit is configured to transmit, to the user device, the list of predicted ELTs for the user-submitted book content.

BRIEF DESCRIPTION OF THE DRAWINGS

The present disclosure will become more fully understood from the detailed description and the accompanying drawings.

FIGS. 7B-7C illustrate flow diagrams describing operation of the book analysis and recommendation system in communication with a reader device.

DETAILED DESCRIPTION

Figure 1:
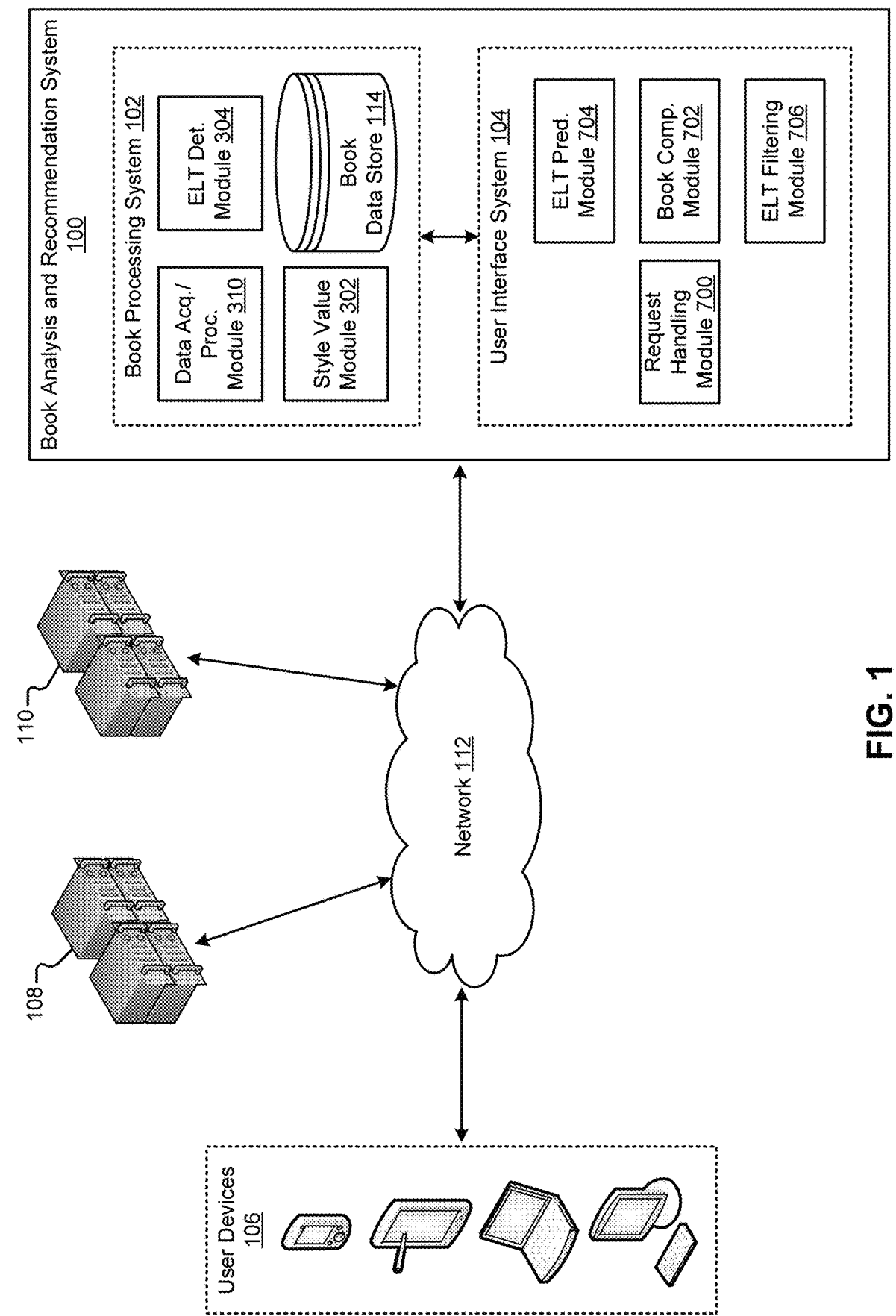
FIG. 1 illustrates an example environment including a book analysis and recommendation system of the present disclosure.

A book analysis and recommendation system 100 of the present disclosure processes book data and reader experience data in order to provide book recommendations to readers and a variety of analyses to book publishers, agents, authors, and other parties. The book analysis and recommendation system 100 is illustrated as including a book data processing system 102 and a user interface system 104. The system 100 is separated into a book data processing system 102 (hereinafter "book processing system 102") and a user interface system 104 for description purposes, such as for highlighting different functional aspects of the book analysis and recommendation system 100. As described herein, the features of the book analysis and recommendation system 100 may be performed by one or more computing devices.

The book processing system 102 analyzes book content and generates writing style values (hereinafter "style values") that indicate the author's writing style associated with the book content. For example, the style values can indicate the pacing of the book, the lyricism associated with the book, the readability of the book, and the writing density associated with the book. The book processing system 102 may determine a plurality of style values for each processed book. Each of the style values for a book may be descriptive of specific aspects of the author's writing style. Taken as a whole, the style values may represent a more complete picture of the author's writing style for the book and capture human-meaningful characteristics of the text.

The book processing system 102 also analyzes reader experience data (e.g., reader reviews and reader ratings) and generates experiential language tags (ELTs) that indicate readers' personal experiences with the book. ELTs may include single words and/or short phrases (two or more words) that articulate the way in which a reader experiences a book. For example, the ELTs may articulate emotional experiences associated with the book, such as thrilling, uplifting, amusing, exciting, and/or thought provoking. As another example, the ELTs may articulate qualities of the book that create an experience for the reader. For example, an ELT may indicate that the book was well-written. The book processing system 102 can determine a plurality of ELTs for each processed book based on reader reviews acquired from a variety of readers. The ELTs determined for the book may represent a variety of experiences (e.g., emotional experiences) that readers have associated with reading the book.

The book analysis and recommendation system 100 can be used by a variety of different parties for different purposes. In general, a user (e.g., reader or publisher) may send a user request (e.g., at 301 in FIG. 3A) to the system 100 and receive a corresponding response (e.g., at 303 in FIG. 3A) from the system 100. In some implementations, the system 100 can receive a request from a reader that is interested in receiving book recommendations (e.g., see FIGS. 7A-7D). The reader request may specify a book that the reader has previously read and enjoyed. Additionally, the reader request may include a list of reader-specified ELTs indicating the type of experience the reader would like in another book. The system 100 can provide book recommendations to the reader in response to the reader request. For example, the system 100 can recommend a list of books to the reader that have a comparable writing style to the reader-specified book and are associated with the reader-specified ELTs.

Figure 8A:
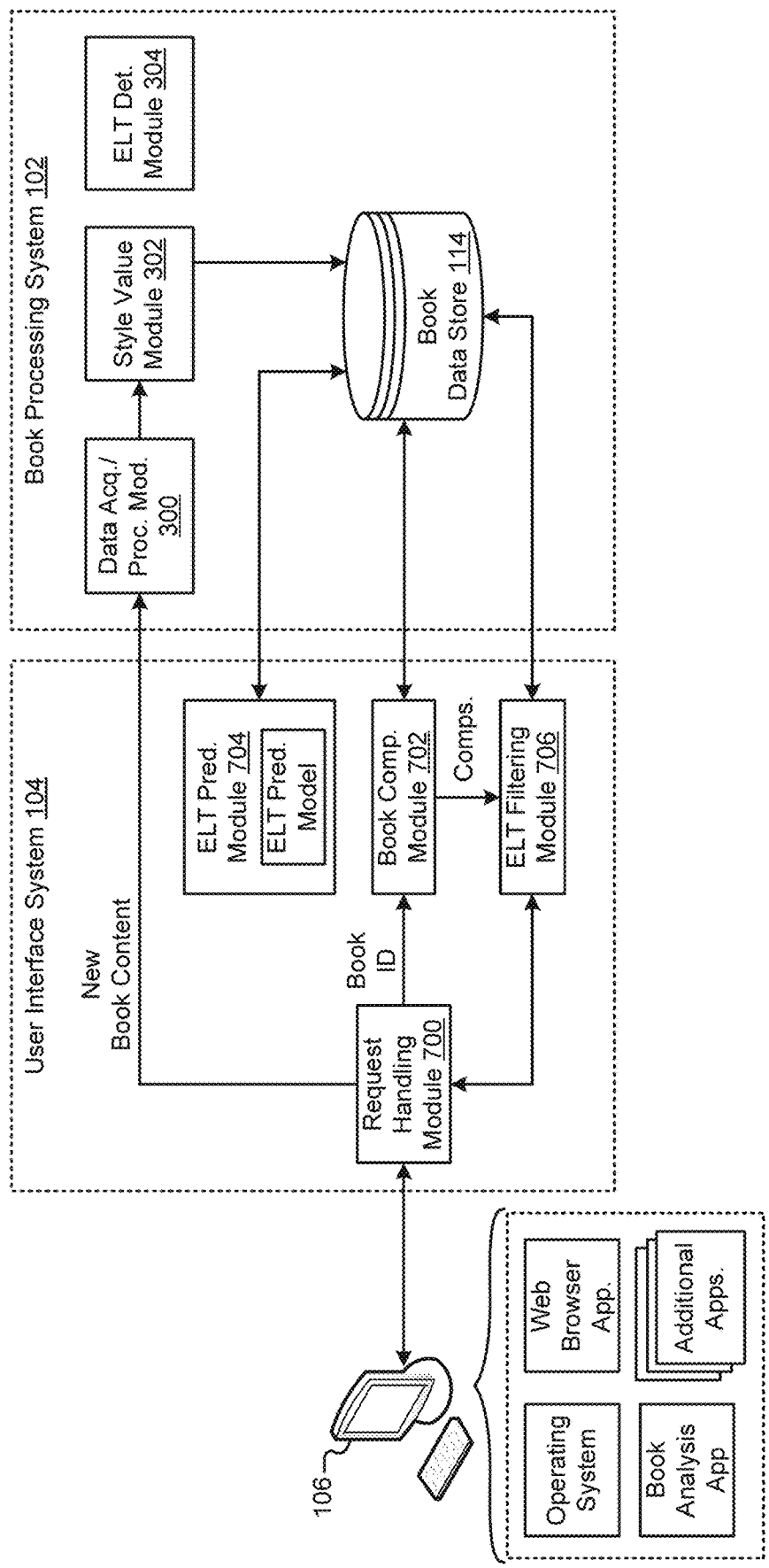
FIG. 8A illustrates a functional block diagram of the book analysis and recommendation system in communication with a publisher device.

In some implementations (e.g., FIGS. 8A-8C), the system 100 can receive a request (hereinafter "analysis request") from a party that wants an analysis of a book (e.g., a new book). For example, the party may want an analysis of the book before reviewing, marketing, and/or selling the book. Examples of these parties may include, but are not limited to, a book publisher, an agent, an editor, the book author, and original content creators. The analysis request can include a submitted book, such as a manuscript for the book. The analysis request may also specify one or more types of analysis being requested for the submitted book. The system 100 may perform a variety of analyses in response to the analysis request. For example, the system 100 may determine style values for the submitted book and predict ELTs for the submitted book. The system 100 can provide the requested analyses in an analysis response. FIG. 8A and FIG. 8C illustrate a publisher device requesting and receiving a book analysis.

The analysis provided by the system 100 may be used for a variety of different purposes. For example, publishers can use the analysis to define a target market for a book and plan publicity and marketing/advertising activities, such as planning for search engine optimization (SEO) for online advertising. Publishers may also use the analysis to aid in creating art (e.g., cover art) and descriptions that suit the book content. Authors can use the analysis to improve their manuscripts and help build interest with agents and publishers. Additionally, if authors decide to publish independently, the analysis results can aid in publicity and marketing/advertising decisions. Agents and editors can use the analysis results to filter incoming content, improve manuscripts, aid in decision making to review/pass on a manuscript, and aid in publicity and marketing/advertising. Agents may also use the analysis to help sell ancillary rights to the content (e.g., in film and/or television). Original content creators may use the analysis to identify quality content to turn into television shows, films, videogames, and/or film/radio advertisements. Example original content creators may include, but are not limited to, film makers, film producers, advertisers, graphic novel editors, and video game producers.

Although the various parties described herein may use the analysis provided by the system 100 to analyze new book titles, in some cases, the parties may use the service to analyze older titles. For example, the parties may wish to revisit (e.g., remarket/advertise) older titles based on currently popular books, current events, currently popular ELTs, and/or current writing styles.

Using writing style and reader experience in analysis of a book may provide a variety of benefits to readers, authors, editors, publishers, agents, and original video content providers. For example, providing reading recommendations to a reader based on writing style and reader experience may result in recommendations that suit the reader's taste in writing style and the reader's current mood (e.g., experiential preference). Providing recommendations to readers based on other factors, such as book genre and reader purchase history, may not be as tailored to readers' distinct reading preferences.

Publishers can use the system 100 to predict ELTs for new books and/or identify comparable existing books based on writing style and user experience (e.g., using predicted ELTs). By using analysis based on writing style and reader experience, publishers can determine how to specifically market upcoming and currently available books to readers. In some cases, publishers can tag books with the ELTs (e.g., on a commercial website) generated by the system 100. Providing the ELTs along with the books may assist readers in discovering new books that suit them, across all genres. The ELTs may also serve as compact reviews that are immediately useful to readers. The system 100 may also benefit authors in a similar manner as publishers, particularly in the case the author wants to forego the route of traditional publishing and analyze/market their own books.

The system 100 may be used to analyze and recommend a variety of content. For example, the system 100 may analyze and recommend works of fiction and non-fiction from a variety of genres, such as science fiction, satire, action and adventure, romance, mystery, horror, and self help. Although the system 100 is illustrated and described herein as analyzing and recommending books, the system 100 may analyze and/or recommend other types of written content, such as articles (e.g., magazine articles), scripts (e.g., film or radio), and stage plays.

Although user devices 106 are illustrated as communicating with the book analysis and recommendation system 100 (e.g., FIGS. 1, 7A, 8A), in some implementations, the book analysis and recommendation system 100 may communicate with a third-party server (e.g., a business partner's server). For example, the third-party server could make requests, receive responses, and format the data in the received responses as a service to customers of the third party.

As described herein, the system 100 can be used to recommend books to readers and/or provide analysis of books to publishers, agents, authors, and other parties. Accordingly, in some implementations, the system 100 may be referred to as a book recommendation system 100 when providing recommendations to readers. In other implementations, the system 100 may be referred to as a book analysis system 100. Although the system 100 may provide recommendations and analysis to users, the features of the system 100 may be tailored to more specific uses. For example, in some implementations, the system 100 may be configured for book recommendations, without providing the analysis features. In other implementations, the system 100 may be configured for book analysis, without providing book recommendation features.

Figure 2:
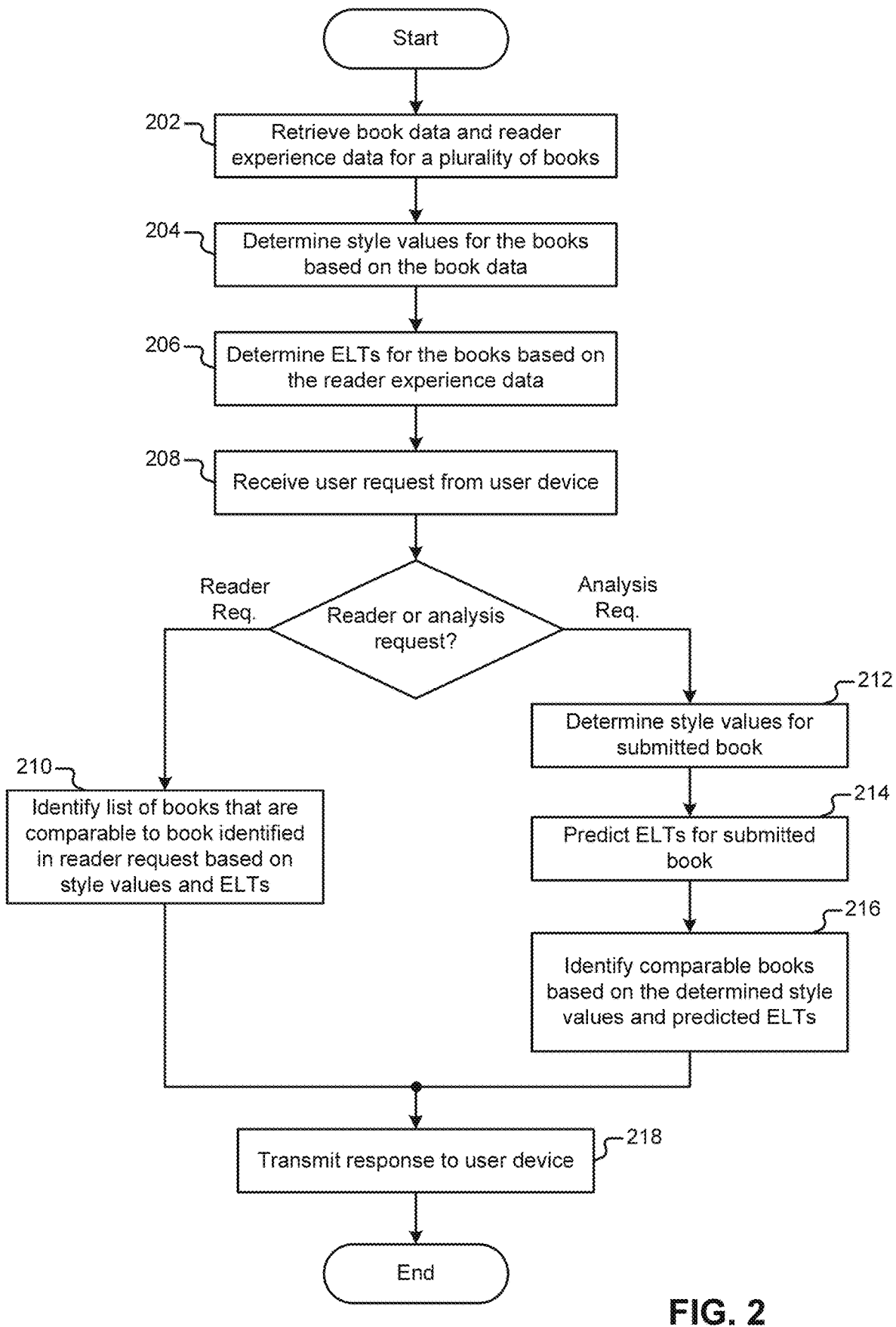
FIG. 2 is a flow diagram illustrating a method describing operation of the environment of FIG. 1.

FIGS. 1-8C illustrate features of the book analysis and recommendation system 100. FIGS. 1-2 are directed to operation of the system 100 in communication with book data servers 108, reader experience servers 110, and user devices 106. FIGS. 3A-3B are directed to operation of the book processing system 102. FIGS. 4A-4B illustrate example book records that may include data related to a book, such as book metadata, style values, and ELTs. FIGS. 5A-6C are directed to generation of style values and ELTs. FIGS. 7A-8C are directed to operation of the system 100 in response to a user, such as a reader or a publisher.

Referring to FIG. 1, an environment includes the book analysis and recommendation system 100 in communication with one or more book data servers 108, one or more reader experience servers 110, and a plurality of user devices 106 via a network 112. The network 112 may include various types of networks, such as a local area network (LAN), wide area network (WAN), and/or the Internet. The user devices 106 can be any computing devices that are capable of providing requests to the system 100 and receiving responses from the system 100. Example user devices 106 include, but are not limited to, mobile computing devices, such as laptops, tablets, smart phones, and wearable computing devices (e.g., headsets and/or watches). User devices 106 may also include other computing devices having other form factors, such as desktop computers and computing devices in vehicles, gaming devices, televisions, or other appliances (e.g., networked home automation devices).

The user devices 106 may use a variety of different operating systems, such as ANDROID® developed by Google Inc., IOS® developed by Apple Inc., MICROSOFT WINDOWS® by Microsoft Corporation, MAC OS® by Apple, Inc., or Linux. The user devices 106 can include an installed web browser application for accessing a web interface provided by the system 100. The user devices 106 may also include additional installed applications, such as a book discovery application and/or a book analysis application described with respect to FIGS. 7A-8C.

The book processing system 102 can retrieve book data from the book data servers 108. Book data may include book content and book metadata. Example book content may include the author's written portion of the book, such as the story of a fiction book. Book metadata may include, but is not limited to, book identification data, such as a book title, author's name, book identification number (e.g., an International Standard Book Number), publisher name, publication date, genre, and number of pages. Additional book metadata may include reader ratings, sales data, and marketing spend.

The book processing system 102 can retrieve book data from a variety of different book data servers 108. In some implementations, the owner/operator of the book processing system 102 can partner with the owner/operator of the book data server 108 that provides book data. In some implementations, the book data servers 108 can provide access to public domain works, such as the Project Gutenberg Literary Archive Foundation of Salt Lake City, Utah. In other implementations, the book data servers 108 can provide access to copyrighted material for limited use or under an agreement between the operator of the book processing system 102 and the owner/licensee of the copyrighted material. Book data servers 108 may also include commercial application/website servers that provide books for sale, such as amazon.com by Amazon.com, Inc. and walmart.com by Wal-Mart Stores, Inc. Additional example book data servers 108 may include book discovery and review application/website servers, such as goodreads.com by Amazon.com, Inc. The commercial servers, book discovery servers, and review servers may also provide book metadata (e.g., book identification data). Instead of retrieving book content via a book data server, in some cases, operators of the book processing system 102 may manually acquire the book content (e.g., by image scanning the book).

In some implementations, instead of the book processing system 102 automatically retrieving the book content and book metadata, the authors, publishers, agents, and/or other parties may submit book content and book metadata to the book processing system 102. For example, a publisher may upload a manuscript for a new book to the book processing system 102 (e.g., via a web interface provided by the book processing system 102). In some implementations, the book data servers 108 may provide an entire book. In other implementations, the book data servers 108 may provide a portion of the book (e.g., a portion of the book content).

The book processing system 102 retrieves reader experience data from the reader experience servers 110. Reader experience data may include reader reviews and/or reader ratings for books. A reader review may include reader provided text that describes the reader's experience with the book. The reader rating may include a value that indicates the reader's overall experience with the book. For example, the reader rating may be a number (e.g., a whole number, decimal value, or a percentage). As another example, the reader rating may be a star rating out of a total number of stars (e.g., 3 out of 5 stars).

In some cases, the book data servers 108 may also serve as reader experience servers 110. For example, commercial application/website servers may provide reader reviews and reader ratings for the books being sold. As another example, reader experience servers 110 may include book discovery and review servers that provide reader reviews and reader ratings. Other example reader experience servers 110 may include social media websites/applications on which readers may post their reviews of a book, social commentary on their experience with the book, and ratings for a book. Example social media websites/applications may include, but are not limited to, facebook.com by Facebook, Inc., twitter.com by Twitter, Inc., and Snapchat by Snap Inc.

The book processing system 102 generates style values and ELTs for a plurality of books based on the retrieved book content and reader experience data. The book processing system 102 stores the style values and ELTs in a book data store 114 along with other data. In this manner, the book processing system 102 may build up a corpus of data (e.g., a corpus of book records 306 of FIG. 4A) that define the writing style and reader experiences for a plurality of books. In some implementations, the book data store 114 may store data for tens of thousands of books (e.g., tens of thousands of book records). In some implementations, the book data store may store data for hundreds of thousands or millions of books (e.g., millions of book records). The size of the corpus may depend on the types of works the book processing system 102 uses to form the corpus. In general, the corpus size may increase in size when storing book records for a greater variety of works, such as works of fiction, non-fiction, biographies, memoirs, and creative non-fiction. The book processing system 102 and the user interface system 104 can use the corpus of data to provide users with reading recommendations (e.g., FIGS. 7A-7D) and analysis data (e.g., FIGS. 8A-8C), such as predicted ELTs for new books and lists of existing books that are comparable to new books.

FIG. 2 illustrates an example method that describes operation of the book analysis and recommendation system 100. The method of FIG. 2 is described with respect to the environment of FIG. 1. Initially, in block 202, the book processing system 102 retrieves book data and reader experience data for a plurality of books. For example, the book processing system 102 may retrieve the book data and the reader experience data from the book data servers 108 and the reader experience servers 110, respectively. In block 204, the book processing system 102 determines style values for the books based on the book data. In block 206, the book processing system 102 determines ELTs for the books based on the reader experience data.

In block 208, the user interface system 104 receives a user request. The user request may be a reader request or an analysis request. If the user interface system 104 receives a reader request, in block 210, the user interface system 104 can identify a list of books that have comparable writing styles (e.g., style values) and experiences (e.g., ELTs) as the book and ELTs specified in the reader request. If the user interface system 104 receives an analysis request, in blocks 212-216, the user interface system 104 can determine style values for the submitted book, predict ELTs for the submitted book, and identify books that are comparable to the submitted book. In block 218, the user interface system 104 transmits a response to the user device 106.

Figure 3A:
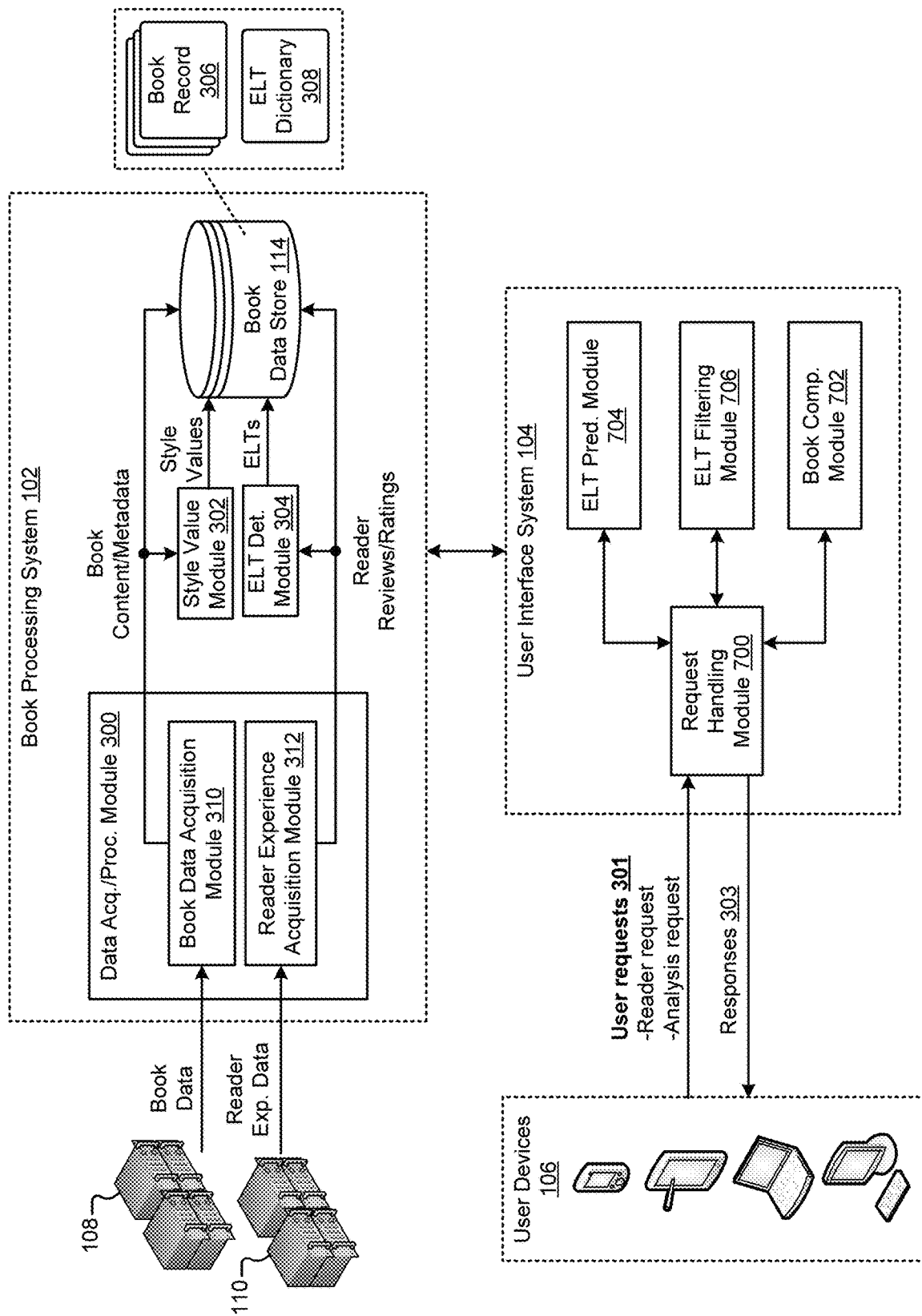
FIGS. 3A-3B illustrate a functional block diagram of a book processing system and a flow diagram describing operation of the book processing system.

FIG. 3A illustrates a more detailed example of the book processing system 102. The book processing system includes a data acquisition and processing module 300 (hereinafter "data acquisition module 300"), a style value determination module 302 (hereinafter "style value module 302"), an ELT determination module 304, and a book data store 114. The data acquisition module 300 acquires and processes book data and reader experience data. The style value module 302 determines style values based on the book content. The ELT determination module 304 determines ELTs based on the reader experience data (e.g., based on reader reviews). The book data store 114 stores a plurality of book records 306 (e.g., FIG. 4A), each of which may include data for an individual book, such as style values, ELTs, and other data. The book data store 114 may also store an ELT dictionary 308 that is used by the ELT determination module 304 to determine ELTs.

Book data may be acquired by the data acquisition module 300 in a variety of different ways described herein. Book data may be categorized as book content data and book metadata. Book content data refers to the portion of the book that includes the author's writing. For example, book content data may refer to the written story of a fiction book (e.g., the written chapters of the book).

Book metadata can include a variety of types of data, such as book identification data and sales data. Book identification data includes data that can be used to identify a book (e.g., uniquely identify a book) among other books. Book identification data may include a book identification number that can be used to uniquely identify a book, such as an International Standard Book Number (ISBN number). Additional example book identification data may include, but is not limited to: 1) a book title/subtitle, 2) one or more author names, 3) an edition number, 4) a publisher name, and 5) a publication date. Book metadata may also include genre, ratings, book sales data (e.g., number of units sold) and marketing spend. Note that some book metadata may also be included in book content. For example, the book title/subtitle can be considered as author-generated content and also book identification data.

The data acquisition module 300 includes a book data acquisition module 310 (hereinafter "book acquisition module 310") that acquires and processes book data. The book acquisition module 310 may use a variety of techniques to acquire and process the book data, depending on how the book data is made available and the format of the book data. In some implementations, the book acquisition module 310 can automatically acquire the book data from the book data servers 108. For example, a book data server (e.g., a partner's server) can provide files that include the book content, which the book acquisition module 310 may automatically acquire. In implementations where the book data server 108 is a web server, the book acquisition module 310 can crawl/scrape the web content from the book data server 108.

In some implementations, the book data server 108 may include files in a text format (e.g., Hypertext Markup Language). In other implementations, the files may be in a format in which the text is not directly accessible as machine-encoded text (e.g., in an image format). In these implementations, the book acquisition module 310 can process the files to acquire the book data in a text format. For example, the book acquisition module 310 may use optical character recognition (OCR) techniques to acquire text from image files. Other example file formats may include extensible markup language (XML), rich text format (RTF), portable document format (PDF), and a Microsoft Word Binary File Format.

In some implementations, the book acquisition module 310 can provide an interface to a user for submitting book data. For example, the book acquisition module 310 may provide a web interface for uploading book data to the book processing system 102. In this example, the user (e.g., publisher, agent, or author) can access the web interface using the user device 106 and upload book data (e.g., a book manuscript) to the book processing system 102. The book processing system 102 may add the book to the corpus by generating a book record for the uploaded book data.

The book acquisition module 310 can extract book metadata and book content from the acquired book data. For example, the book acquisition module 310 can extract book metadata text directly from available text and/or process (e.g., OCR) the book data and then extract book metadata text. The book acquisition module 310 may generate a book record in the book data 114 store for each newly encountered book. For example, the book acquisition module 310 may initially determine whether the book is included in the corpus based on book identification data (e.g., ISBN number). If the book does not have a book record in the book data store 114, the book acquisition module 310 may generate a new book record. The book acquisition module 310 may store book metadata in the book record.

The book acquisition module 310 can extract book metadata for a single book from one or more sources. In some cases, the book acquisition module 310 can extract book metadata from a single file that includes both book metadata and book content. In some cases, the book acquisition module 310 may acquire book metadata from a source other than the file(s) including the book content. For example, the book acquisition module can extract book metadata from a website (e.g., a commercial/review website) and extract book content from a file submitted by a user.

The book acquisition module 310 extracts book content from the retrieved book data. The style value module 302 determines style values based on the extracted book content. In some implementations, the book acquisition module 310 can store some, or all, of the book content in a book record. In these implementations, the style value module 302 may process the stored book content at a later time (e.g., to update/modify style values). In other implementations, the style value module 302 may determine style values upon extraction of the book content. The book content may then be discarded instead of stored.

The book acquisition module 310 can extract portions of text from the book content for analysis by the style value module 302. In some cases, book data includes book metadata and book content. For example, the book metadata may be located at the front of the book (e.g., in the beginning of the book). In these cases, the book acquisition module 310 can start book content extraction after the book metadata (e.g., jump over the book metadata). For example, the book acquisition module 310 can jump over the initial text of the book (e.g., including publisher/author/foreword/copyright text, etc.) and start extraction at the beginning of the book content (e.g., chapter 1).

The style value module 302 may determine style values without using all of the written content of the book. Put another way, the style value module 302 may determine style values based on one or more portions of the book content. Accordingly, the book acquisition module 310 may be configured to extract one or more specified portions of the book content for use in generating style values. For example, the book acquisition module 310 may be configured to acquire a set number of characters, words, sentences, or pages for analysis. The amount of content to be extracted may be referred to herein as a "content extraction value."

The content extraction value may be selected by the owner/operator of the book processing system 102 based on a number of words/sentences that provides a representative example of the author's writing style. Additionally, or alternatively, the content extraction value may be selected based on a number of words/sentences that a reader may read a book to determine whether they will continue reading. In one specific example, the book acquisition module 310 can be configured to extract 500-1000 sentences from the book. For example, the book acquisition module 310 can be configured to extract the first 500-1000 sentences from the start of the book content for use in analysis by the style value module 302. In another specific example, the content extraction value may be in terms of pages. In this example, if the content extraction value is 50 pages, the book acquisition module 310 may extract the first 50 pages of text after omitting (e.g., jumping over) the front matter (e.g., including publisher, author, foreword, copyright text, etc.). Although the book acquisition module 310 may be configured to extract a portion of book content based on the content extraction value, in other implementations, the book acquisition module 310 may be configured to extract all book content for analysis (e.g., after the front matter).

In some implementations, the book acquisition module 310 can retrieve book data for a book from a single source (e.g., a single file). For example, if the book acquisition module 310 retrieves an entire book (e.g., cover to cover), the book acquisition module 310 can extract book metadata and book content using the retrieved book. Although the book acquisition module 310 can retrieve book data from a single source, in some cases, the book acquisition module 310 may use multiple sources (e.g., at different times) to generate a book record for a single book. For example, the book acquisition module 310 may retrieve book metadata and book content for a single book via one or more book data servers 108 and/or user submissions.

The data acquisition module 300 includes a reader experience acquisition module 312 (hereinafter "experience acquisition module 312") that acquires and processes reader experience data. Reader experience data may include reader reviews and reader ratings. A reader review for a book can include freeform text written by an individual that read the book. The reader review can include the reader's evaluation of the book and indicate the reader's overall experience with the book.

Reader ratings can be numbers that indicate the reader's level of satisfaction with the book. For example, the reader rating can be an integer value or decimal value. In general, a greater reader rating indicates that the reader was more satisfied with the book. Different reader experience servers 110 may provide reader ratings in different formats and/or values.

The experience acquisition module 312 may use a variety of techniques to acquire and process the reader experience data, depending on how the reader experience data is made available. In some implementations, the experience acquisition module 3112 can automatically acquire the reader experience data from the reader experience servers 110. For example, if the reader experience data is included on web servers, the experience acquisition module 312 can crawl/scrape the web content from the reader experience servers 110. In a more specific example, the experience acquisition module 312 can retrieve data from websites including reader reviews, such as book commerce sites and book review sites. In these examples, the reader experience server 110 may include files in a text format (e.g., HTML).

The experience acquisition module 312 can acquire reader experience data for a single book from one or more sources. For example, the experience acquisition module 312 may extract reader experience data for a single book from a single website or multiple websites. In some cases, the experience acquisition module 312 may acquire reader experience data from the same servers (e.g., websites) as the book data. For example, the experience acquisition module 312 may acquire reader experience data from a commerce website that sells the book, provides book metadata, and provides reader experience data for the book.

Figure 6A:
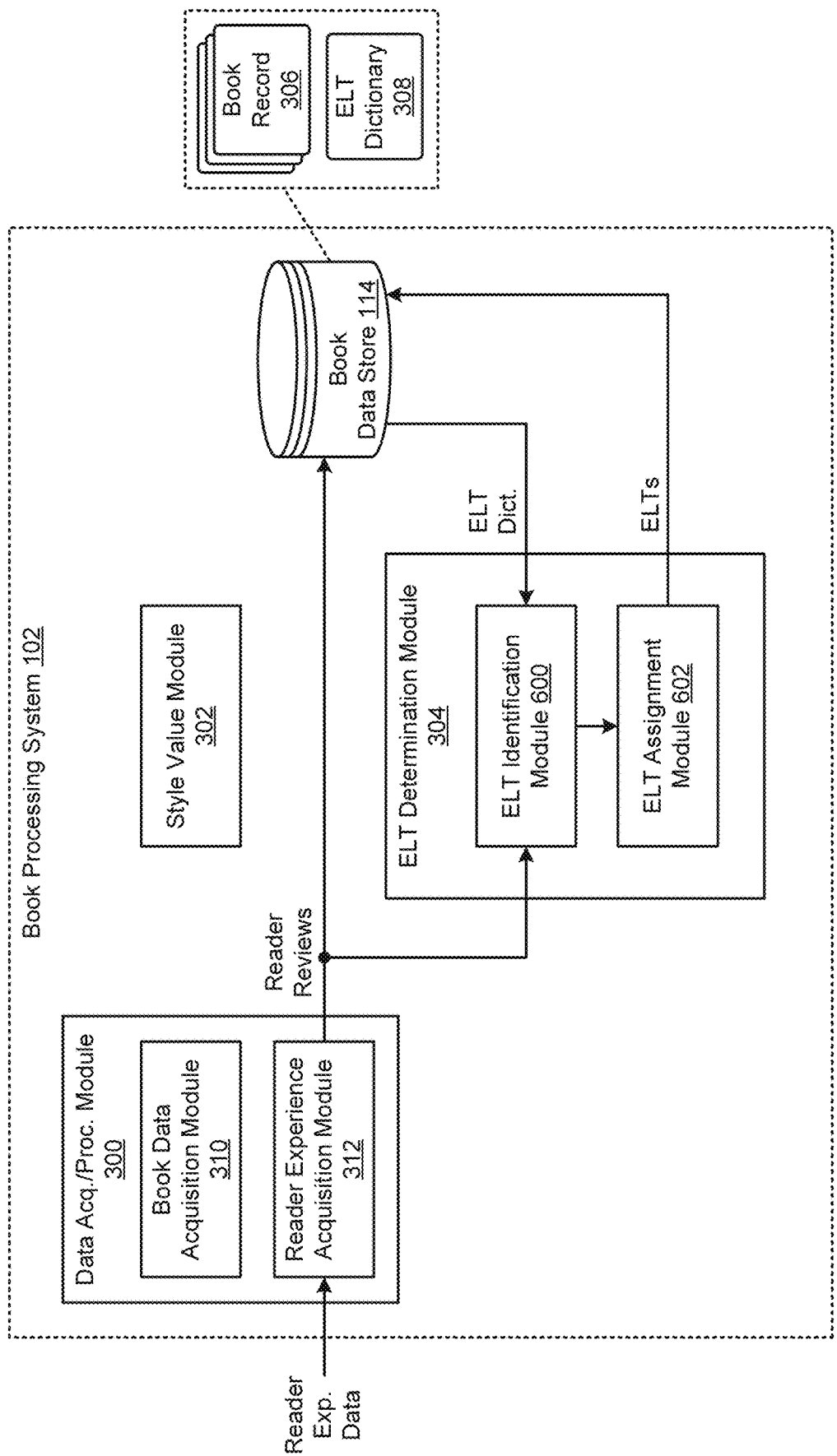
FIGS. 6A-6B illustrate a functional block diagram of an example experiential language tag (ELT) determination module and a flow diagram describing operation of the ELT determination module.
Figure 6B:
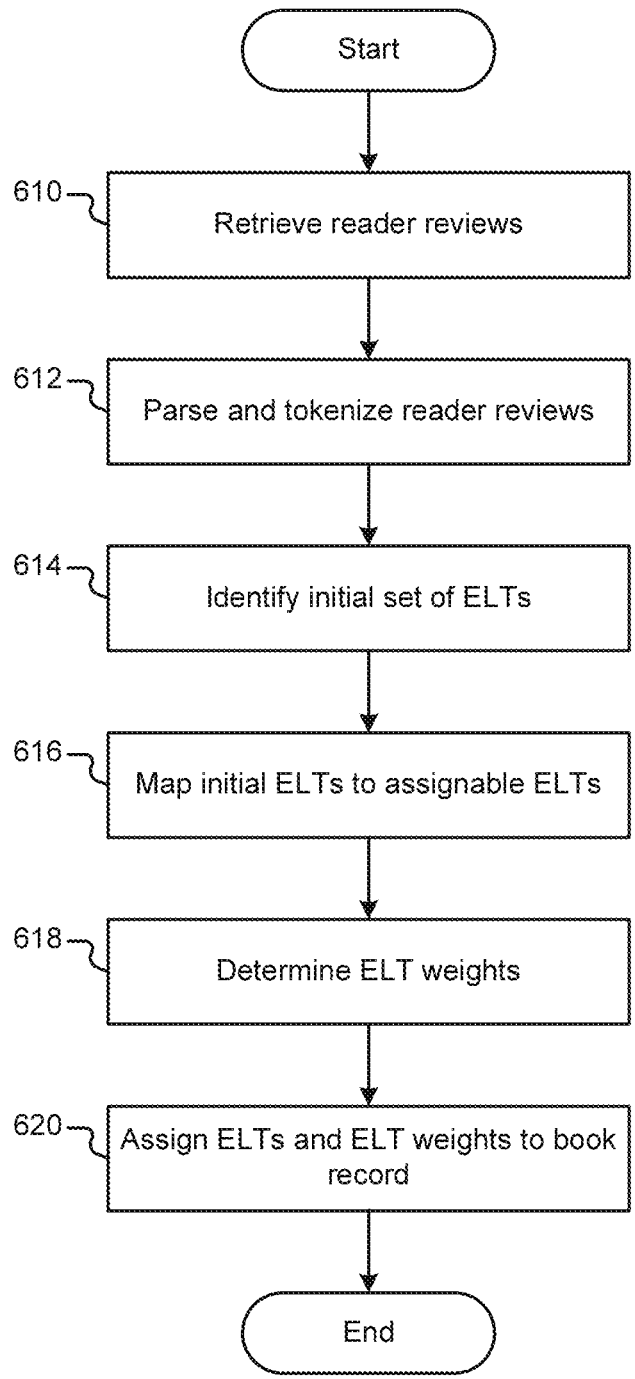
Figure 6C:
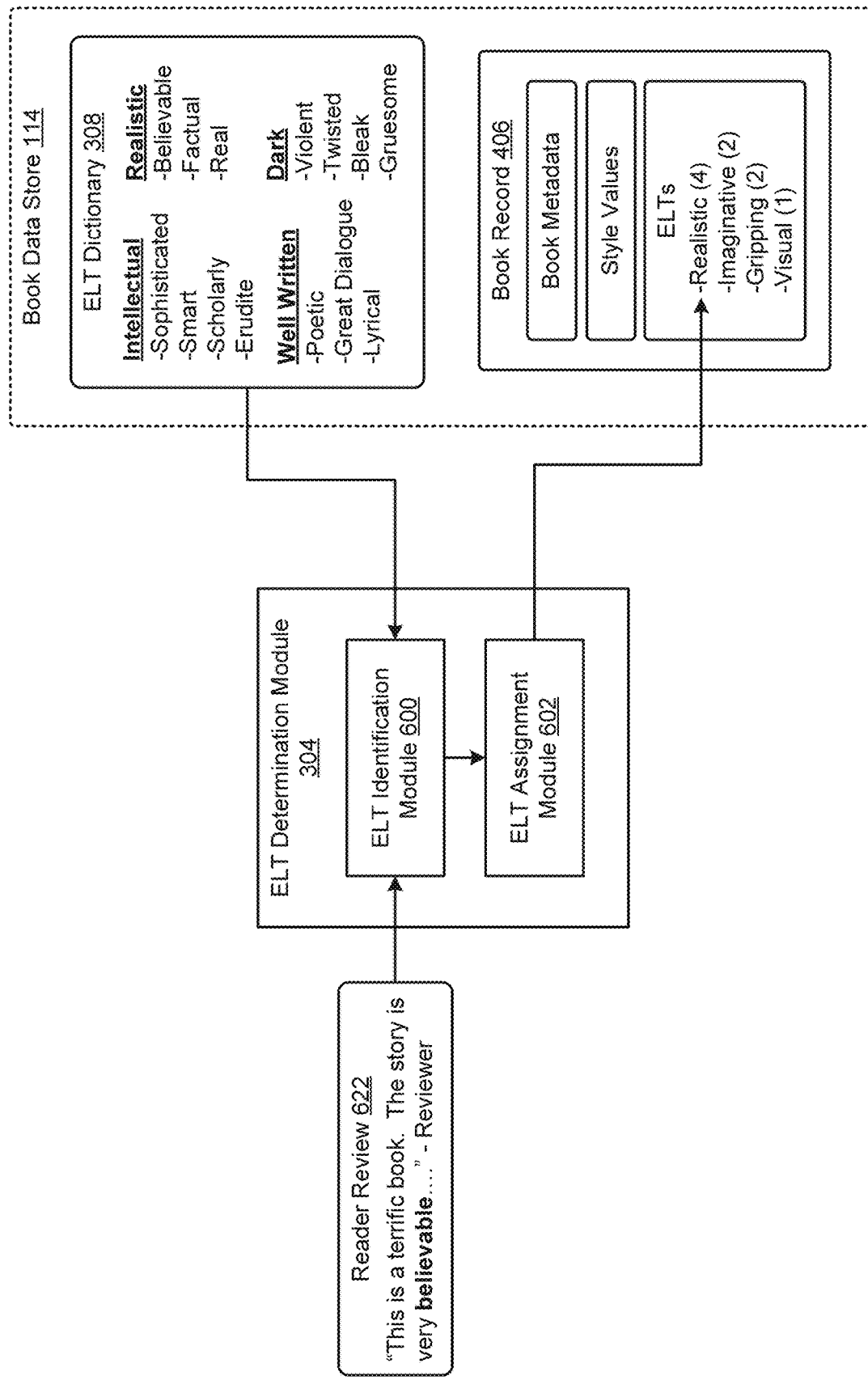
FIG. 6C illustrates the ELT determination module of FIG. 6A processing a reader review.

As described with respect to FIGS. 6A-6C, the ELT determination module 304 determines ELTs based on the acquired reader experience data. In some implementations, the experience acquisition module 312 can store some, or all, of the reader experience data in a book record. In these implementations, the ELT determination module 304 may process the stored reader experience data at a later time. In other implementations, the ELT determination module 304 may determine ELTs upon acquisition of the reader experience data. The reader experience data may then be discarded instead of stored.

Figure 3B:
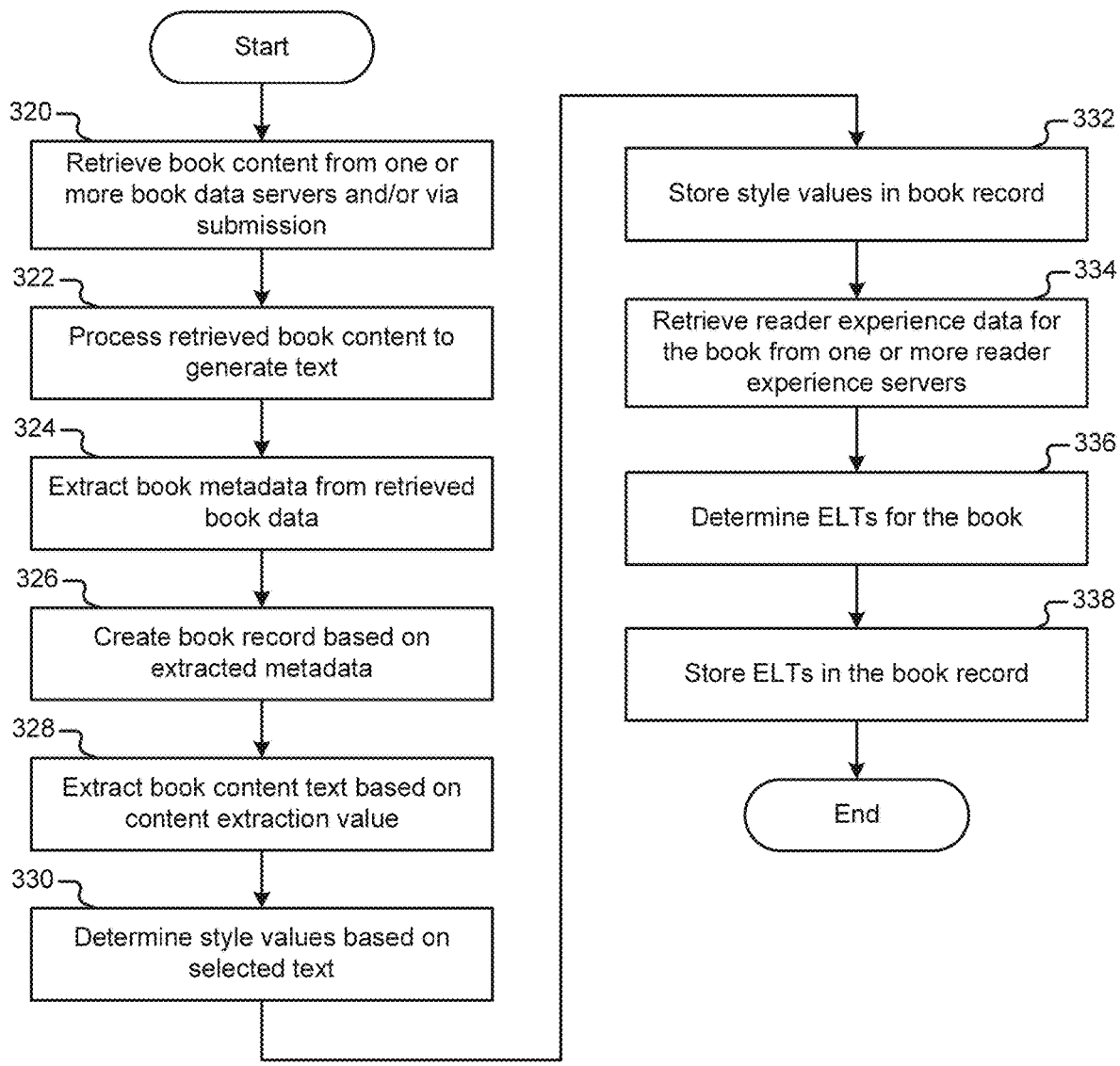

FIG. 3B illustrates an example method for acquiring and processing book data and reader experience data. The method of FIG. 3B is described with reference to FIG. 3A. In block 320, the book acquisition module 310 retrieves book content from one or more book data servers 108 and/or via submission. If the book content is in a format in which text is not directly accessible, the book acquisition module 310 processes the book content to generate machine readable text (e.g., performs OCR) in block 322. In block 324, the book acquisition module 310 extracts book metadata from the retrieved book data. In block 326, the book acquisition module 310 determines that the book data store 114 does not include a book record for the book based on the extracted metadata. The book acquisition module 310 creates a new book record including the extracted metadata.

In block 328, the book acquisition module 310 extracts text from book content based on the content extraction value (e.g., a predetermined number of sentences). In block 330, the style value module 302 determines style values based on the extracted text. In block 332, the style value module 302 stores the style values in the book record. In some implementations, the book acquisition module 310 may store the book data (e.g., book content) used to generate the style values.

In block 334, the experience acquisition module 312 retrieves reader experience data for the book from one or more reader experience servers 110. In blocks 336-338, the ELT determination module 304 determines the ELTs for the book and stores the ELTs in the book record. In some implementations, the experience acquisition module 312 may store the reader reviews and/or scores used to generate the ELTs.

Figures 4A, 4B:
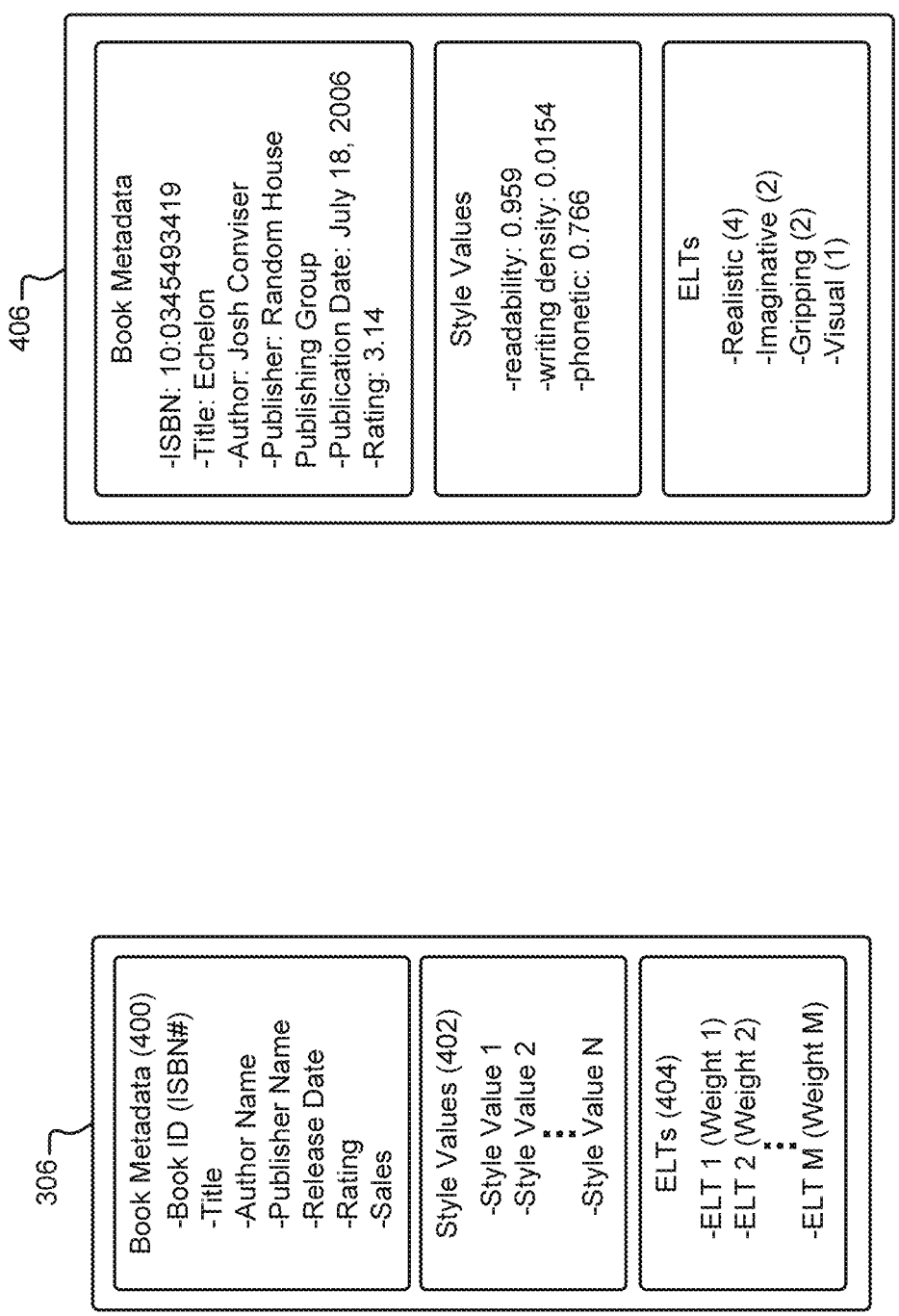
FIGS. 4A-4B illustrate example book records.

FIG. 4A illustrates an example book record 306. The book record 306 includes data for a single book. The book data store 114 stores a plurality of book records, each for a different book. For example, the book data store 114 may store a book record for each book that is processed. The book data store 114 may include a variety of different data structures that are used to implement the book records, such as one or more databases, indices (e.g., inverted indices), tables, files, or other data structures.

The book record 306 of FIG. 4A includes book metadata 400 that can be used to uniquely identify the book associated with the book record 306. The book metadata 400 may also be used to identify the book record 306 among other book records included in the book data store 114. In some implementations, the book record 306 may include a separate unique identifier (not illustrated) for uniquely identifying the book record 306. The book metadata of FIG. 4A includes a book ID (ISBN number), a book title, the book author's name, book publisher's name, publication date, rating, and sales numbers (e.g., number of units sold to date). The book metadata may include additional and/or alternative metadata than the metadata 400 illustrated in FIG. 4A.

The book record 306 includes a plurality of style values 402 for the book (e.g., N style values, where N is an integer greater than or equal to one). For example, as described with respect to FIGS. 5A-5B, the style value module 302 determines style values and stores the style values in the book record 306. The book record 306 also includes a plurality of ELTs 404 associated with the book (e.g., M style values, where M is an integer greater than or equal to 1). For example, as described with respect to FIGS. 6A-6C, the ELT determination module 304 determines ELTs and stores the ELTs in the book record 306. In some implementations, each of the ELTs in a book record can have an associated ELT weighting value ("ELT weight"). The ELT weight may be a number indicating how often the ELTs have been associated with the book (e.g., assigned to the book). In FIG. 4A, the book record 306 includes an ELT weight for each of the ELTs.

Book records may include a different amount of data than illustrated in FIG. 4A, depending on how the book processing system 102 is configured. For example, a book record may store a different amount of metadata than illustrated in FIG. 4A. In some implementations, the book acquisition module 310 can store book content in the book record, such as the portion(s) of text used to generate the style values. In these implementations, the style value module 302 may use the stored book content at a later time to perform additional, or alternative, style value calculations. In some implementations, the experience acquisition module 312 may store reader experience data in the book record, such as the reader review text used to generate ELTs. In these implementations, the ELT determination module 304 may use the stored reader reviews at a later time to perform additional, or alternative, ELT determinations.

FIG. 4B illustrates an example book record 406 for a specific book. The book record 406 in FIG. 4B is for the book titled "Echelon," by author Josh Conviser. The ISBN number of the book is ISBN-10:0345493419. The book was published by Random House Publishing Group on Jul. 18, 2006. The reader rating for the book is 3.14 stars. The style values for the book include a readability style value of 0.959, a writing density style value of 0.0154, and a phonetic style value of 0.766. These style values, along with additional style values, are described herein. The ELTs for the book (e.g., based on reader reviews) include imaginative (2), gripping (2), visual (1), and realistic (4). Although the book record 406 includes 3 style values and 4 ELTs, additional/alternative style values and ELTs described herein may be included in the book records.

Figure 5A:
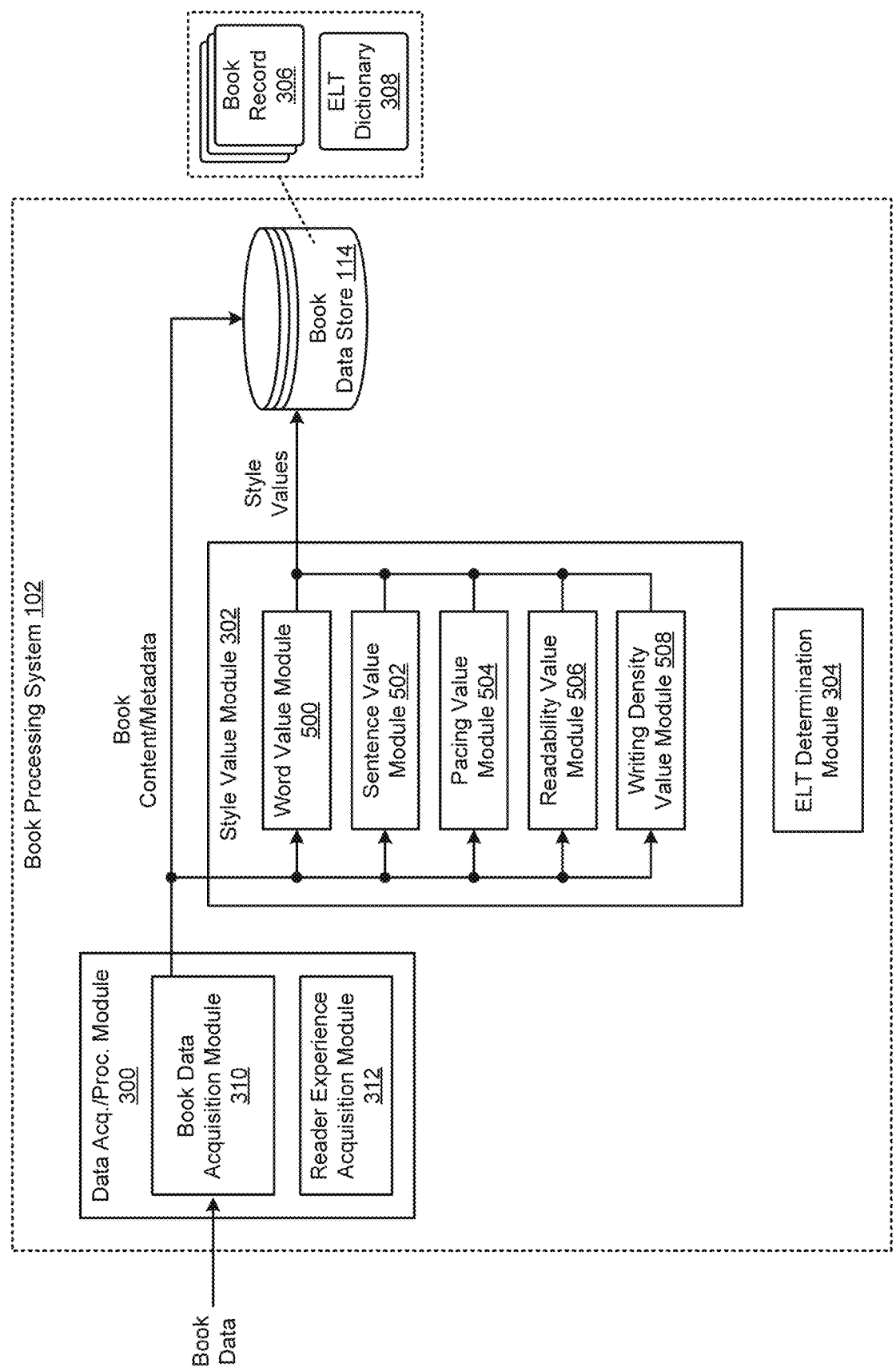
FIGS. 5A-5B illustrate a functional block diagram of an example style value module and a flow diagram describing operation of the style value module.

FIG. 5A illustrates an example style value module 302 that determines style values based on the book content acquired by the book acquisition module 310. Each of the modules included in the style value module 302 determines one or more different style values. The style values determined by the modules may be numbers, such as decimal values (e.g., 0.000-1.000) and/or integers. Some style values may be calculated based on other style values.

The style values calculated by the style value module 302 may be used to identify books that have a similar writing style to user-specified books (e.g., in the reader/analysis requests). For example, the style values may be used to identify books that have a similar writing style to a publisher/reader-specified book (e.g., FIGS. 7A-8C). As another example, the style values may be used to predict ELTs for new books or unreviewed books.

Figure 5B:
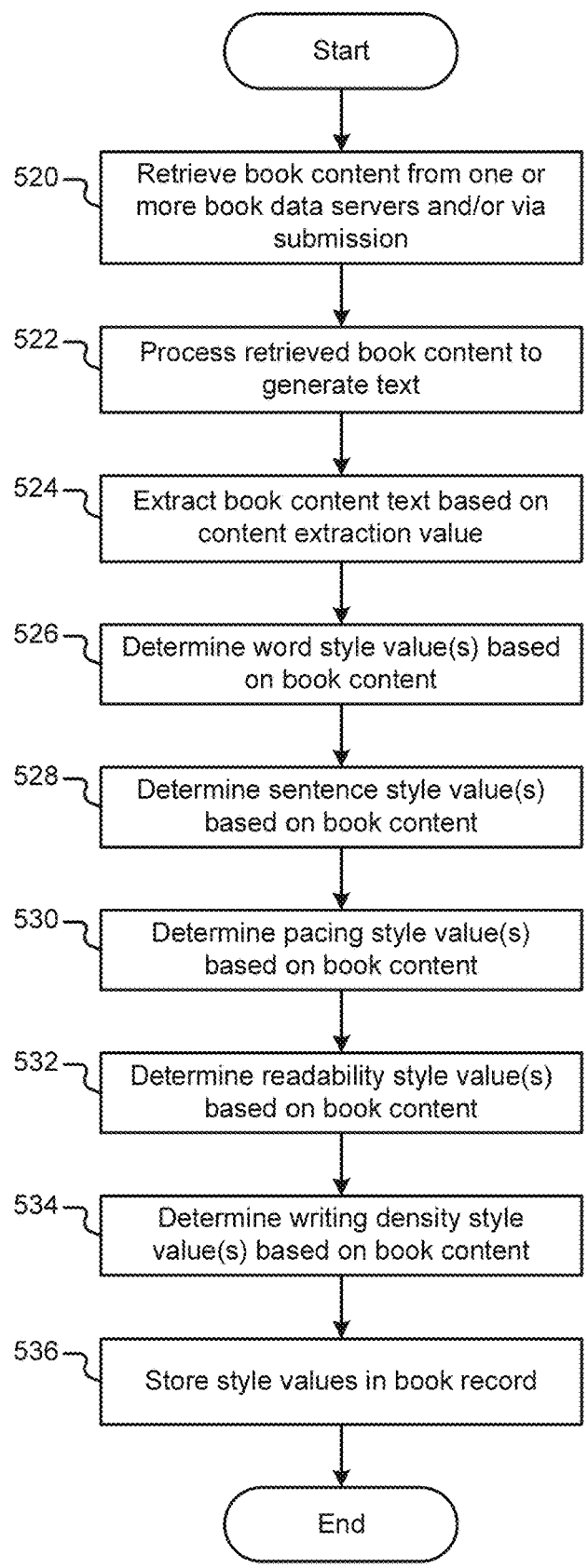

The owner/operator of the system 100 may configure the system 100 to determine a variety of different style values. For example, the system 100 may be configured to determine and use any of the style values described herein in addition to other style values not explicitly described herein, such as other values calculated in the field of computational linguistics. As such, the style values calculated by the system 100 illustrated in FIGS. 5A-5B are only an example set of style values that may be calculated by the system 100. In some implementations, computing the style values may include computing text structure (e.g., plosives, fricatives, homogeneity, alliteration, rhyming, etc.), computing sentiment (e.g., using a wordnet lexical database), computing the distribution of various parts of speech (e.g., nouns, adjectives, verbs, adverbs), and computing readability (e.g., as a function of syllables per word, words per sentence, sentences per paragraph, etc.).

Some style values may be calculated based on analysis of the number of characters, words, and/or sentences included in the book content. Examples of such style values may include, but are not limited to, a number-of-words value that indicates the number of words in the book content, a number-of-characters value that indicates the number of characters in the book content, an average-word-length value that indicates the average length of words in the book content, and average-sentence-length values that indicate the average number of characters and/or words per sentence in the book content. Additional example style values may include, but are not limited to, a pacing style value, a readability style value, a writing density value, phonology style values, rhyme style values, alliteration style values, homogeneity style values, fricative style values, plosives style values, sentiment style values, topic style values, content style values, and sentic concept style values. Additional style values may include phrasal style values, clausal style values, counts/occurrences of individual tokens (e.g., words/punctuation), token pairs (e.g., bigrams), and consecutive letters (e.g., blocks of 3 letters, 4 letters, and 5 letters).

FIG. 5A illustrates an example style value module 302 that determines style values based on the book content. The style value module 302 includes a word value module 500, a sentence value module 502, a pacing value module 504, a readability value module 506, and a writing density value module 508. The modules included in the style value module 302 of FIG. 5A are only example modules that may be included in the style value module 302. In other implementations, the style value module 302 may include additional/alternative modules that calculate other style values. For example, a style value module 302 may include modules that determine any of the style values described herein.

The word value module 500 determines one or more style values associated with the number of characters and words included in the book content. For example, the word value module 500 may determine a number-of-words value that indicates the number of words in the book content, a number-of-characters value that indicates the number of characters in the book content, and/or an average-word-length value that indicates the average length of words in the book content. The values determined by the word value module 500 may include numbers, such as integers and/or decimal values. In some implementations, the values may be normalized decimal values between 0.000-1.000.

The sentence value module 502 determines one or more style values associated with sentence lengths included in the book content. For example, the sentence value module 502 may determine an average-sentence-length value that indicates the average number of characters and/or words per sentence in the book content. The values determined by the sentence value module may include numbers, such as integers and/or decimal values. In some implementations, the values may be normalized decimal values between 0.000-1.000.

The pacing value module 504 determines a pacing style value. The pacing style value indicates the pacing of the book (e.g., based on sentence length). The pacing value module 504 may determine the pacing style value based on sentence length. In some implementations, a pacing value closer to 1 may indicate a faster paced writing style.

The readability value module 506 determines a readability style value. The readability style value may indicate the readability of the book content, such as the amount of education a person may need to understand the text. In some implementations, the readability value module 506 may calculate the Gunning fog index to use as a readability value. In these implementations, the readability value module 506 may determine the readability style value based on average sentence length and the number of complex words in the book content. The readability value module 506 may also calculate additional/alternative readability style values using other calculations, such as calculations based on the Flesch reading-ease test, the Flesch-Kincaid grade level formula, the Lix readability formula, the Rix readability formula, and/or the Simple Measure of Gobbledygook (SMOG) readability formula.

The writing density value module 508 determines a writing density style value. The writing density style value may relate to the specificity and number of lexical items used in a text. In some implementations, the writing density value module 508 may calculate the writing density of the book content based on at least one of: 1) the number of words in the book content, 2) the number of characters in the book content, 3) the average word length in the book content, 4) the average sentence length in the book content, and 5) the average words per sentence in the book content.

FIG. 5B illustrates an example method for generating style values. The method of FIG. 5B is directed to the example style value module 302 of FIG. 5A. In other implementations of the style value module 302, the style value module 302 may include other modules and corresponding operations for determining style values. In block 520, the book acquisition module 310 retrieves content from one or more book data servers 108 and/or via user submission. In block 522, the book acquisition module 310 processes the book content to generate text. In block 524, the book acquisition module 310 extracts book content text based on the content extraction value.

In blocks 526-528, the word value module 500 and the sentence value module 502 each determine one or more style values based on the book content. In block 530, the pacing value module 504 determines one or more pacing style values based on the book content. In block 532, the readability value module 506 determines one or more readability style values based on the book content. In block 534, the writing density value module 508 determines one or more writing density style values based on the book content. In block 536, the style value module 302 stores the style values in a book record.

FIG. 6A illustrates an example ELT determination module 304 that determines ELTs based on reader review data. The ELT determination module 304 includes an ELT identification module 600 and an ELT assignment module 602. The ELT identification module 600 identifies ELTs included in reader reviews. The ELT assignment module 602 may assign one or more ELTs to the book based on the identified ELTs. For example, if the book is a thriller, the ELT assignment module 602 may assign the ELTs of fear, curiosity, and joy to the book, assuming such ELTs are identified as being associated with the book. The ELT assignment module 602 may assign any number of ELTs to a book. Although the ELT determination module 304 may automatically determine ELTs based on user reviews, in some implementations, operators of the system 100 may manually input ELTs for books (e.g., based on reviews and/or personal reading experiences).

The book data store 114 includes an ELT dictionary 308 that includes a plurality of ELTs, such as terms and phrases that are associated with possible reader experiences. The ELT determination module 304 (e.g., ELT identification module 600) identifies terms/phrases included reader reviews that are also included in the ELT dictionary. The ELT determination module 304 (e.g., ELT assignment module 602) assigns one or more ELTs from the ELT dictionary to the book. Example ELTs may include, but are not limited to, absorbing, tragic, joyful, thrilling, fear, exhilarating, beautiful, uplifting, inspirational, curiosity, amusing, exciting, thought provoking, and page turner. Additional example ELTs may include funny, happy, sad, scary, moody, dark, fantastical, witty, touching, engaging, romantic, suspenseful/exciting, inspiring, poignant, magnificent, great plot, well written, strong characters, descriptive, light read, unique, intellectual, honest, realistic, straightforward, mythical/theology, and bittersweet.

The ELT identification module 600 obtains reader reviews for books and determines whether ELTs from the ELT dictionary are associated with the reader reviews. In some implementations, the ELT identification module 600 can process individual reader reviews. For example, the ELT identification module 600 may retrieve a single reader review and identify terms from the ELT dictionary 308 for the single review (i.e., on a per-review basis). In other implementations, the ELT identification module 600 can process multiple reader reviews at one time. For example, the ELT identification module 600 can retrieve multiple reader reviews and identify terms from the ELT dictionary 308 in the aggregation of reader reviews. In a more specific example, the ELT identification module 600 may parse/tokenize and cluster reader reviews for a book to extract the most commonly used terms/phrases.

The ELT assignment module 602 assigns one or more ELTs to a book based on the terms identified by the ELT identification module 600. In some implementations, the ELT assignment module 602 can assign ELTs on a per review basis. In other implementations, the ELT assignment module 602 may assign one or more ELTs to a book based on the terms identified in the aggregation of reader reviews.

The ELT assignment module 602 may be configured to assign identified ELTs to a book record in a variety of ways. In some implementations, the ELT assignment module 602 may assign all the ELTs identified by the ELT identification module 600. In other implementations, the ELT assignment module 602 may perform further operations before assigning ELTs identified by the ELT identification module 600. For example, the ELT assignment module 602 may assign ELTs based on how often the ELTs are present in reader reviews. In this example, the ELT assignment module 602 may assign ELTs if the ELTs are present in a threshold percentage of the reader reviews. In another example, the ELT assignment module 602 may be configured to assign the most commonly occurring ELTs (e.g., a predetermined number of the most commonly identified ELTs).

The ELT dictionary 308 includes a plurality of ELTs. In some implementations, a subset of the ELTs included in the ELT dictionary 308 are assignable to the book records. In these implementations, each of the assignable ELTs may map to one or more additional ELTs included in the ELT dictionary. For example, the assignable ELTs may be synonymous with, or similar to, the ELTs that map to it. In a sense, the assignable ELTs may be viewed as categories of ELTs into which ELTs in the ELT dictionary 308 may be mapped. Condensing the ELTs in the ELT dictionary 308 to a smaller set of assignable ELTs may allow single assignable ELTs to have a broader meaning to the users and result in a more manageable set of ELTs. The condensed set of ELTs may also aid in ELT prediction operations, as the potential set of predictable ELTs may be smaller.

In implementations including an assignable set of ELTs, the ELT assignment module 602 may initially determine which ELTs in the ELT dictionary 308 apply to the user reviews. Then, the ELT assignment module 602 may determine how each of the ELTs map to the assignable ELTs. The ELT assignment module 602 can then assign ELTs for the book based on the mappings.

In a specific example, the ELT dictionary may include assignable ELTs of funny, sad, and well written, among other possible assignable ELTs. The ELT "funny" may have associated ELTs of humorous, hilarious, comedic, and amusing. The ELT "sad" may have associated ELTs of melancholy and heartbreaking. The ELT "well written" may have associated ELTs of great dialogue, tightly written, intricate writing, and elegant. In the above specific ELT dictionary, if the ELT identification module 600 identifies the ELTs humorous, melancholy, and elegant in the reader reviews, then the ELT assignment module 602 assigns the assignable ELTs of funny, sad, and well written to the book.

The ELTs in the ELT dictionary 308 can be updated over time. For example, the assignable ELTs may be modified and/or the mapping of ELTs to the assignable ELTs may be modified. In some cases, ELTs may be added or removed from the ELT dictionary 308. The ELT determination module 304 (e.g., the ELT identification module 600 and ELT assignment module 602) may update the book records after the ELT dictionary has been updated.

In some implementations, the ELT determination module 304 (e.g., the ELT assignment module 602) may assign an ELT weight to each ELT for a book. The ELT weight associated with the ELT may indicate the number of times the ELT has been associated with the book. For example, the ELT weight may indicate the number of reviews that are associated with the ELT. In some implementations, the ELT weights may be normalized values (e.g., 0.000-1.000) that indicate the relative occurrence of the ELTs in reader reviews (e.g., the percentage of reviews including the ELTs).

FIG. 6B illustrates a method for generating ELTs. The method of FIG. 6B is directed to the ELT determination module 304 of FIG. 6A. In block 610, the reader experience module 312 retrieves reader reviews for a book. In block 612, the ELT identification module 600 may parse and tokenize the retrieved reader reviews. In block 614, the ELT identification module 600 identifies an initial set of ELTs included in the parsed/tokenized reader reviews. In block 616, the ELT assignment module 602 then maps each of the ELTs included in the initial set of ELTs to assignable ELTs. In block 618, the ELT assignment module 602 may determine ELT weights to assign for each of the assignable ELTs based on the number of occurrences of ELTs associated with the assignable ELTs. In block 620, the ELT assignment module 602 assigns the ELTs and ELT weights to the book record.

FIG. 6C illustrates the assignment of an ELT to the example book record 406 of FIG. 4B. The ELT dictionary 308 of FIG. 6C includes a plurality of ELTs. The bold ELTs are assignable by the ELT assignment module 602. The ELTs listed under the bold ELTs are ELTs that are mapped to the assignable ELTs. In FIG. 6C, the reader experience module 312 retrieves a reader review that includes the text "This is a terrific book. The story is very believable . . . " In FIG. 6C, the ELT identification module 600 identifies the ELT "believable" in the reader review as being included in the ELT dictionary 308.

The ELT assignment module 602 maps the identified ELT "believable" to the assignable ELT "Realistic." The ELT assignment module 602 assigns the ELT "Realistic" to the book record 406. In FIG. 6C, ELTs in the book record 406 include ELT weights. When assigning the ELT "Realistic" to the book record, the ELT assignment module 602 may increment the ELT weight for "Realistic" to 4, which may indicate that the reader review is the fourth reader review associated with the ELT "Realistic."

FIGS. 7A-8C illustrate operation of the user interface system 104 and book processing system 102 for a variety of different requests. The user interface system 104 includes a request handling module 700 that interfaces with the user device 106. For example, the request handling module 700 may receive a user request and provide a response. The user interface system 104 includes modules that make various determinations, which can be used to generate the user response.

The user interface system 104 includes a book comparison module 702, an ELT prediction module 704, and an ELT filtering and ranking module 706 (hereinafter "ELT filtering module 706"). The book comparison module 702 can determine an amount of similarity between two books based on the style values and/or ELTs associated with the books. The ELT prediction module 704 generates predicted ELTs for a book (e.g., a new book and/or unreviewed book) based on style values associated with the book. The ELT filtering module 706 filters and/or ranks the comparable books based on the ELTs associated with the books and user-specified ELTs.

As described herein, each book can have a set of style values associated with it. The book comparison module 702 determines an amount of similarity between the sets of style values associated with different books. The book comparison module 702 may determine the similarity in a variety of ways. In one example, the book comparison module 702 can apply a cosine measure of similarity to sets of style values for pairs of books (e.g., each pair of books) and use the cosine measures to find similar books.

The ELT prediction module 704 can generate predicted ELTs based on an inputted set of style values. In some implementations, the ELT prediction module 704 can include a model (referred to herein as an "ELT prediction model"). The ELT prediction model outputs one or more predicted ELTs for an input set of style values. In some examples, the ELT prediction model may include one or more machine learned models (e.g., supervised learning models) configured to receive one or more style values. In these implementations, the style values may be referred to as "style value features" and the set of style value features may be referred to as a "style value feature vector." The one or more machine learned models may generate predicted ELTs based on the style value feature vector. During operation, the ELT prediction module 704 may retrieve the style values for a book (e.g., from the book data store 114 and/or the style value module 302) and input the style value feature vector into the one or more machine-learned models to predict one or more ELTs for the book. In some examples, the machine-learned model may include a set of decision trees.

The ELT prediction model may include one or more machine learned models using algorithms including, but not limited to, Nearest Neighbors, a Support Vector Machine, linear regression, random forests, and a neural network (e.g., hierarchical neural network). The ELT prediction model may be trained using ELTs for the books included in the book data store 114 along with associated style values. Computing the feature vectors used for training may include computing text structure (e.g., plosives, fricatives, homogeneity, alliteration, rhyming, etc.), computing sentiment (e.g., using a wordnet lexical database), computing the distribution of various parts of speech (e.g., nouns, adjectives, verbs, adverbs), and computing readability (e.g., as a function of syllables per word, words per sentence, sentences per paragraph, etc.). Use of the feature vectors and the associated ELTs to train one or more machine learning algorithms implemented by the ELT prediction model can result in an ELT prediction model that understands patterns in the feature vectors for each ELT.

The following example illustrates how predicting ELTs during book analysis may assist a variety of parties (e.g., authors, publishers, agents, etc.) having different purposes (e.g., marketing/advertising). In this example, assume a book can be classified as women's fiction because the author typically writes under this classification. The ELT prediction for the book may result in a list of ELTs that differ from, or further define, that classification. For example, the predicted ELTs for the book may include "thrilling" or "suspenseful," which means that the book may be marketable to a thriller/suspense audience in addition to a women's fiction audience. In this example, the ELT prediction may present the author with a 'new market' in the thriller/suspense space along with the author's typical appeal to the women's fiction space. Additionally, a reader that is interested in the thriller/suspense space may more readily discover the book, assuming it has been tagged in some manner with the predicted ELTs.

The request handling module 700 may use the functionality of one or more modules in the user interface system 104 and/or book processing system 102 in order to respond to the requests. FIGS. 7A-8C illustrate example interactions between a user device 106 and the user interface system 104 for different requests (e.g., reader/analysis requests). The interactions in FIGS. 7A-8C are example interactions. As such, the user interface system 104 may interact with users in a different manner than explicitly illustrated herein. For example, user requests may include requests for information other than that illustrated in FIGS. 7A-8C, and the user interface system 104 may provide responses that satisfy the requests.

Figure 7A:
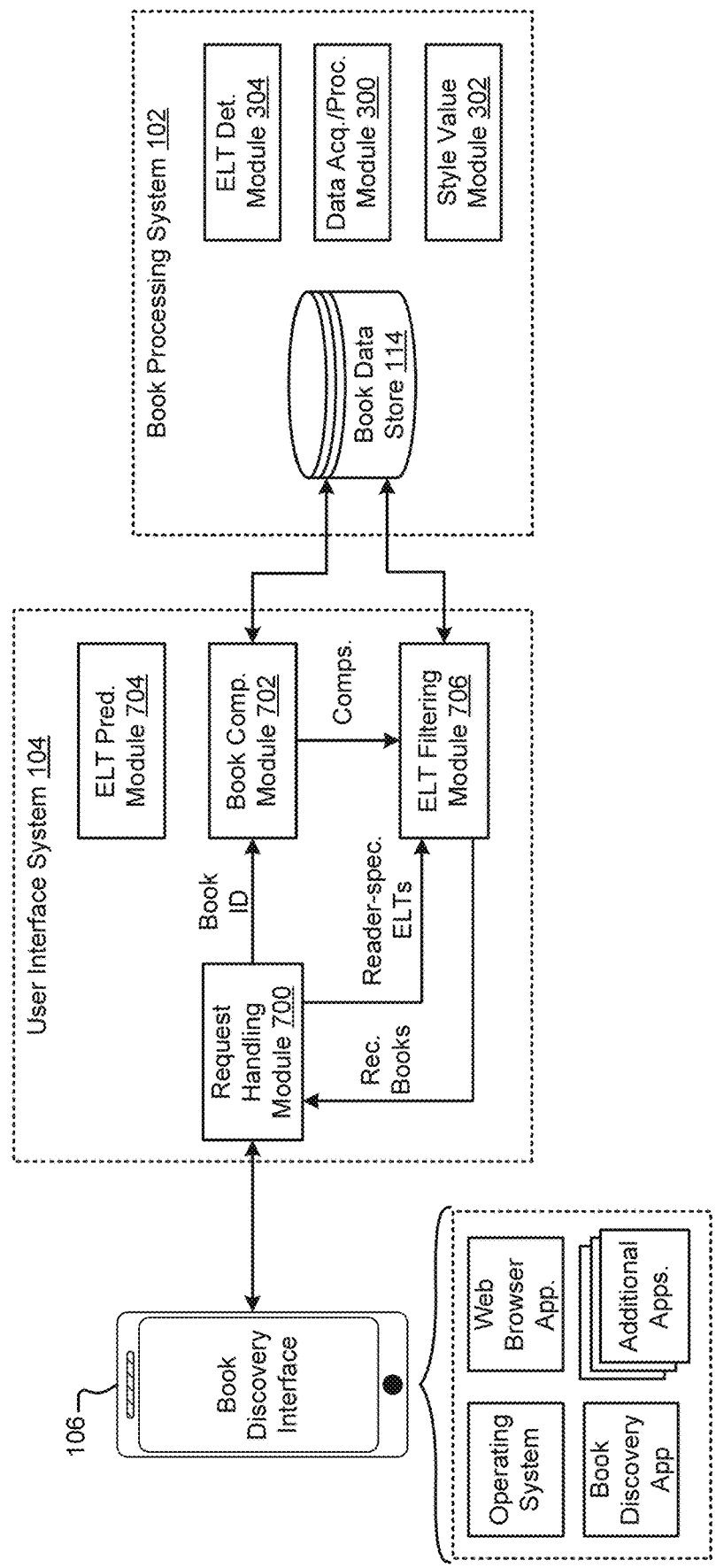
FIG. 7A illustrates a functional block diagram of the book analysis and recommendation system in communication with a reader device.

FIG. 7A illustrates an example user device 106 in communication with the user interface system 104. The user device 106 illustrated in FIG. 7A is a mobile computing device (e.g., a smartphone/tablet computing device). Although a smartphone/tablet computing device is illustrated in FIG. 7A, the user device 106 may be another type of computing device, such as a desktop/laptop computing device or a wearable computing device. In FIG. 7A, the user device 106 is used by a reader that would like a list of recommended books from the user interface system. Accordingly, the user device 106 of FIG. 7A may be referred to as a "reader device."

The request handling module 700 can provide a user interface for the reader device 106 (e.g., a web interface). The user interface provided to the reader may be referred to as a "book discovery interface." The reader may interact with the book discovery interface to generate a reader request.

The book discovery interface may prompt the reader to specify a book they have enjoyed. In some implementations, the book discovery interface may also prompt the reader to specify the type of experience they are looking for in another book. The experiences that can be specified by the reader may correspond to ELTs in the ELT dictionary 308.

In the book discovery interface, the reader can specify a book they enjoyed and, in some implementations, specify one or more ELTs indicating the experience they would like in another book. The reader can then interact with the book discovery interface to transmit the reader request to the user interface system 104 (e.g., using a GUI element such as a submit button). The reader request may include book identification metadata, such as book identifier that identifies the book the reader enjoys. The reader request may also include the reader-specified ELT(s), if such an option is provided by the book discovery interface.

The request handling module 700 receives the reader request. The book comparison module 702 identifies a list of books that are comparable to the reader-specified book. Specifically, the book comparison module 702 may identify a list of books that are comparable in writing style to the reader-specified book. Initially, the book comparison module 702 retrieves style values for the reader-specified book based on the book identification metadata associated with the reader-specified book. The comparison module 702 then performs the comparison operations (e.g., cosine similarity) to identify a set of comparable books based on the style values associated with the comparable books.

The ELT filtering module 706 filters and/or ranks the list of comparable books based on ELTs that are specified by the reader and/or associated with the reader-specified book. In some implementations, the ELT filtering module 706 can filter out books from the list of comparable books based on the ELTs associated with the reader-specified book. In these implementations, if any books in the list of comparable books are not associated with ELTs of the reader-specified book, the ELT filtering module 706 may filter out those books, as the books are not associated with a user's desired experience. Similarly, if the reader specifies ELTs in the book discovery interface, the ELT filtering module 706 may filter out books from the list that are not associated with the reader-specified ELTs. In some implementations, the ELT filtering module 706 may rank the list of comparable books according to the reader-specified ELTs and/or the ELTs associated with the reader-specified book. For example, the ELT filtering module 706 may rank books higher on the list of comparable books if more ELTs are matched. In a specific example, the ELT filtering module 706 may place books at the top of the list that match the most ELTs.

The request handling module 700 may then transmit the list of filtered and/or ranked books to the reader device 106 for display on the book discovery interface. The filtered and/or ranked list of comparable books may be referred to herein as "recommended books." The list of recommended books may include a variety of display data that may be used by the book discovery interface to display the results to the user. Example display data may include the book title, book author, book rating, one or more review snippets for the book, a summary of the book, one or more pages of the book text, and one or more images associated with the book (e.g., a cover image). The request handling module 700 may also transmit one or more Uniform Resource Locators (URLs) for accessing the book on a website (e.g., a commercial website). The reader device 106 may display the list of recommended books as an ordered list (e.g., ordered on the page according to rank).

In some implementations, the reader device 106 may include an installed book discovery application that provides similar features as the book discovery interface. The reader device 106 can download the application from a digital distribution platform, such as the GOOGLE PLAY® digital distribution platform by Google, Inc. or the APP STORE® digital distribution platform by Apple, Inc. The reader can use the application to request book recommendations in a manner similar to that described above with respect to the book discovery interface provided by the request handling module 700. For example, the book discovery application can receive reader input, transmit reader requests, receive responses, and display recommended books.

FIG. 7B illustrates an example method for recommending books to a reader. The method of FIG. 7B is described with respect to FIG. 7A. The method of FIG. 7B is directed to an implementation of the user interface system 104 that filters/ranks books based on one or more reader-specified ELTs.

In block 710, the request handling module 700 receives a reader request from a reader device 106. The reader request includes a reader-specified book (e.g., book ID) and one or more reader-specified ELTs. In block 712, the book comparison module 702 identifies a set of books that are comparable to the book specified in the reader request. In block 714, the ELT filtering module 706 filters and/or ranks the list of comparable books. For example, the ELT filtering module 706 may filter and/or rank the list of comparable books based on the reader-specified ELT(s). In block 716, the request handling module 700 transmits the recommended list of books that has been filtered and/or scored to the reader device 106.

The request handling module 700 may receive reader-specified ELTs in a variety of ways. In some implementations, the reader may input the ELTs into the book discovery interface and transmit the reader-specified ELTs along with the original reader request including the reader-specified book. In other implementations, the original reader request may include a reader-specified book, but not a reader-specified ELT. Instead, the request handling module 700 may identify a list of ELTs associated with the reader-specified book and transmit the list of ELTs to the reader device 106. The reader may then make a selection of one or more of the received ELTs and transmit another reader request including the reader-specified ELTs. Providing a reader with a list of ELTs associated with their specified book may provide a positive user experience in that it may limit the number of ELT selections for the reader to consider. A more limited ELT selection may be more relevant and easier for the reader to manage.

FIG. 7C illustrates another example method for recommending books to a reader. In the method of FIG. 7C, the reader does not specify ELTs in the book discovery interface. Instead, the list of comparable books is automatically filtered and/or scored based on the ELTs associated with the reader-specified book.

In block 720, the request handling module 700 receives a reader request from a reader device 106. The reader request includes a reader-specified book. In block 722, the book comparison module 702 identifies a set of books that are comparable to the book specified in the reader request. In block 724, the request handling module 700 determines ELTs associated with the reader-specified book. In block 726, the ELT filtering module 706 filters and/or ranks the list of comparable books based on the ELTs associated with the reader-specified book. In block 728, the request handling module 700 transmits the list of recommended books that has been filtered and/or ranked to the reader device 106.

Figure 7D:
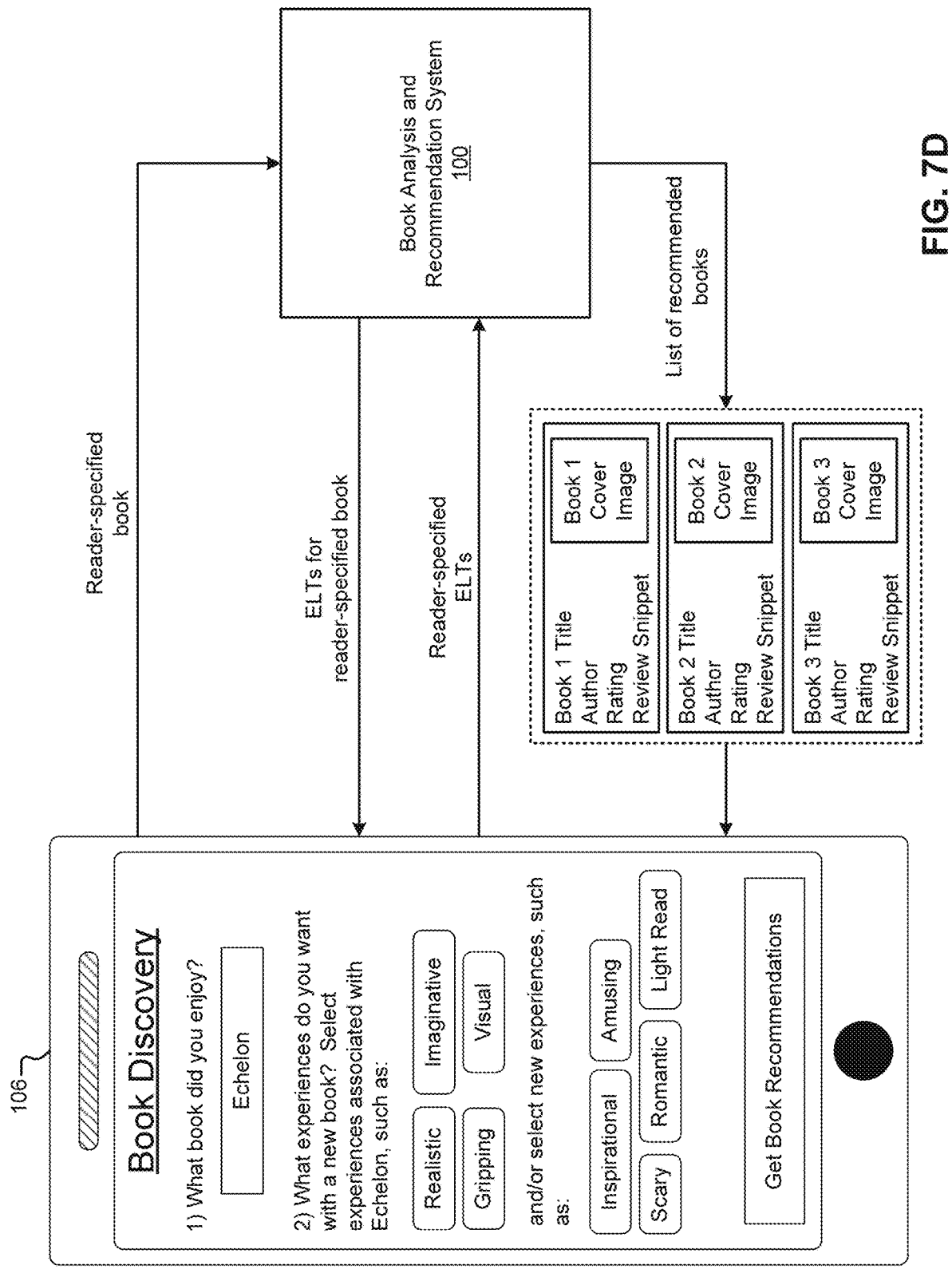
FIG. 7D illustrates an example book discovery interface on the reader device.

FIG. 7D illustrates an example book discovery interface on a reader device 106. In FIG. 7D, the book discovery interface prompts the reader to enter a book that they enjoy. The user indicates that they enjoy the book "Echelon" (e.g., see FIG. 4B). The user may specify the book they enjoy using a variety of different GUI elements, such as search fields, freeform text fields, drop down menus, or other GUI elements. After the reader has specified the book they enjoyed, the book analysis and recommendation system 100 transmits, to the reader device 106, a list of ELTs associated with the reader-specified book along with a list of additional ELTs.

The book discovery interface then prompts the user to select ELTs. Note that the book discovery interface separates the ELTs into a group of ELTs associated with the book (e.g., Realistic, Imaginative, Gripping, and Visual) and a group of other ELTs (e.g., Inspirational, Amusing, Scary, Romantic, and Light Read). The user may select the ELTs (e.g., by touching/clicking the ELTs). Although the book discovery interface of FIG. 7D includes selectable ELT button GUI elements, in other implementations, the ELTs may be specified by the reader using other GUI elements, such as freeform text entry and/or drop down menus. The reader-specified ELTs are transmitted to the book analysis and recommendation system 100.

The book analysis and recommendation system 100 transmits the list of recommended books to the reader device 106 for display on the book discovery interface. As illustrated in FIG. 7D, the list of recommended books may include book titles, authors, ratings, review snippets, and book cover images. The list of recommended books may be displayed to the reader as a list, a portion of which is illustrated in FIG. 7D. Although a list of three recommended books is illustrated for display in FIG. 7D, additional books may be displayed on the book discovery interface.

FIG. 8A illustrates an example user device 106 in communication with the user interface system 104 and the book processing system 102. The user device 106 of FIG. 8A is being used by a publisher to request analysis of a new book. Accordingly, the user device 106 of FIG. 8A may be referred to as a "publisher device 106." The user device 106 illustrated in FIG. 8A is a desktop computing device. Although a desktop computing device is illustrated in FIG. 8A, the user device 106 may be another type of computing device, such as a mobile computing device.

The request handling module 700 can provide a user interface for the publisher device 106 (e.g., a web interface). The user interface provided to the publisher may be referred to as an "analysis interface." The publisher may interact with the analysis interface to generate an analysis request. The analysis interface may prompt the publisher to submit a book and specify a variety of analysis, such as a book comparison analysis and an ELT prediction analysis.

In the analysis interface, the publisher can submit a book to be uploaded (e.g., book content and book metadata). Additionally, the publisher can interact with the analysis interface to select the desired type(s) of analysis. The publisher can then interact with the analysis interface (e.g., select a submission GUI button) to transmit the analysis request to the user interface system 104. The analysis request includes the submitted book content and metadata (e.g., a manuscript) along with data indicating the types of analysis requested. The user interface system 104 and the book processing system 102 perform the requested analysis of the new book and transmit an analysis response to the publisher device 106. In some implementations, the publisher device 106 may include an installed book analysis application that provides similar features as the analysis interface.

Figure 8B:
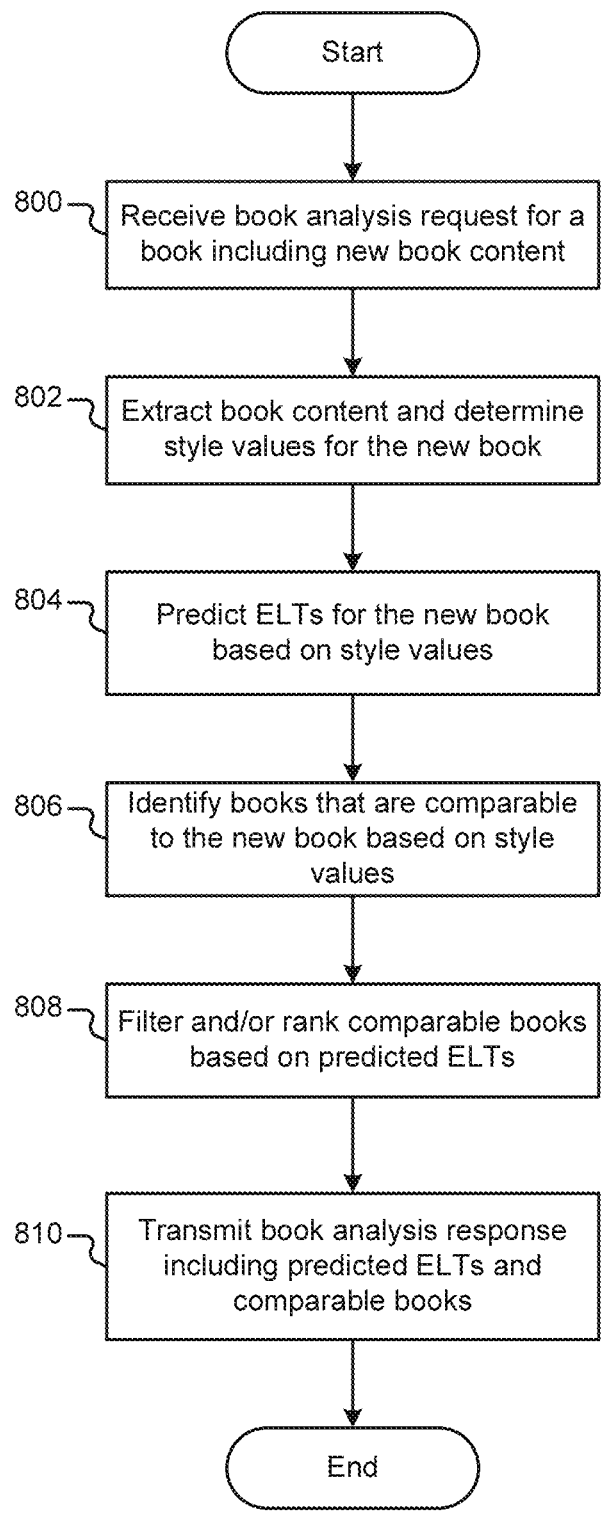
FIG. 8B illustrates a flow diagram describing operation of the book analysis and recommendation system in communication with a publisher device.
Figure 8C:
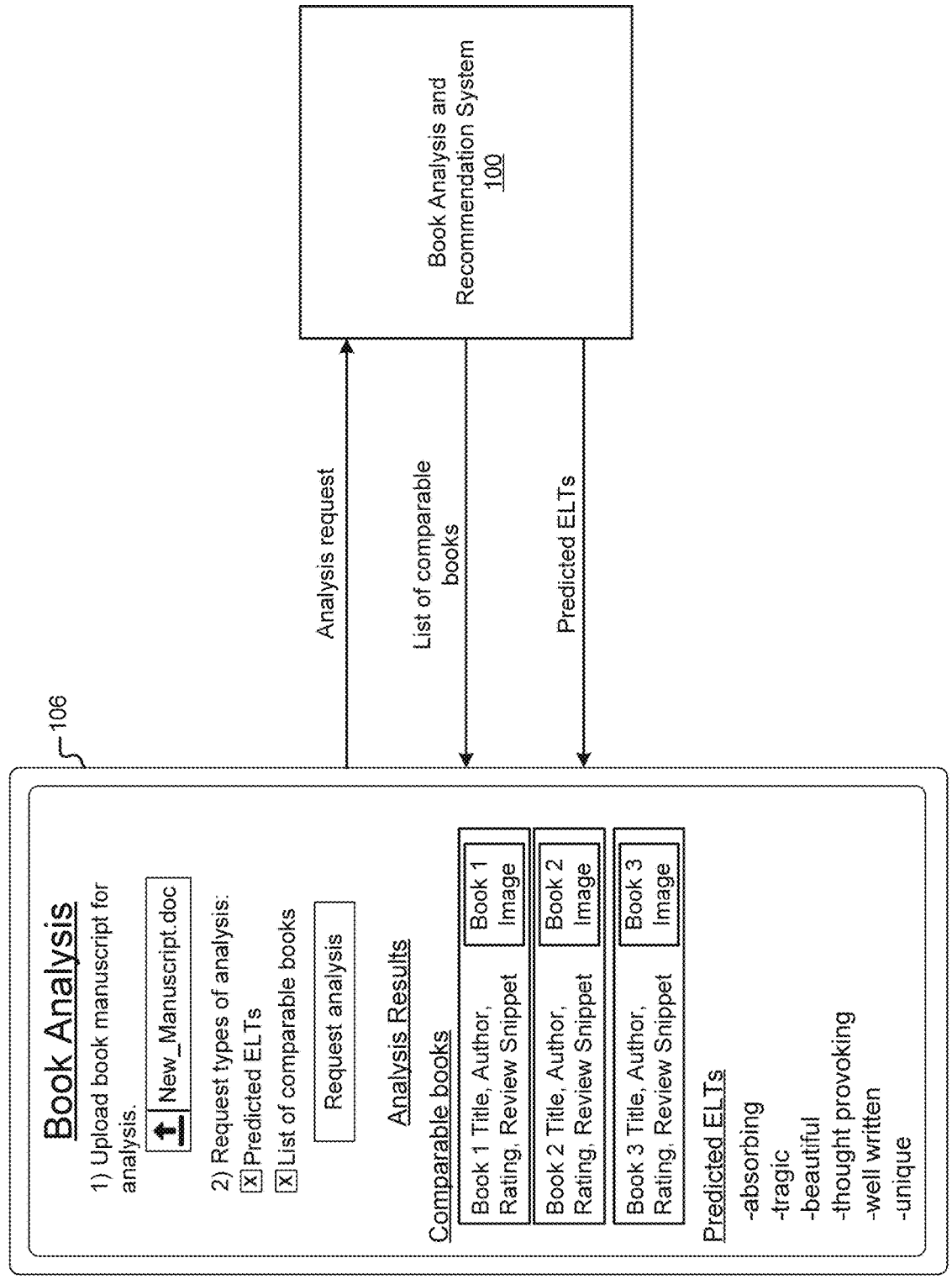
FIG. 8C illustrates an example analysis interface on the publisher device.

FIG. 8B illustrates an example method for analyzing a submitted book. The method of FIG. 8B is described with respect to FIG. 8A. In block 800, the request handling module 700 receives an analysis request from a publisher device 106. The analysis request includes submitted book content (e.g., for a new book) and indicates that the publisher is requesting a predicted ELT analysis and a list of comparable books. In block 802, the book acquisition module 310 extracts the book content from the submitted book and the style value module 302 determines style values for the book based on the extracted book content.

In block 804, the ELT prediction module 704 predicts one or more ELTs for the new book based on the style values. In block 806, the book comparison module 702 identifies a set of books that are comparable to the submitted book. In block 808, the ELT filtering module 706 filters and/or ranks the list of comparable books based on the predicted ELTs. In block 810, the request handling module 700 transmits, to the publisher device 106, the predicted ELTs and the list of comparable books that are filtered and/or ranked based on the predicted ELTs.

FIG. 8C illustrates an example analysis interface on a publisher device 106. In FIG. 8C, the analysis interface prompts the publisher to upload a book for analysis and specify the types of analysis to perform. In FIG. 8C, the publisher has uploaded a manuscript in a .doc file format titled "New_Manuscript.doc" and indicated that the system 100 should predict ELTs and provide a list of comparable books for the manuscript. The publisher can interact with the "Request analysis" GUI button to generate the analysis request.

The system 100 may identify a list of comparable books for the manuscript and predict ELTs for the manuscript. The system 100 transmits the list of comparable books and predicted ELTs to the publisher device 106 for display. In FIG. 8C, the analysis interface displays a list of three comparable books and a list of predicted ELTs.

Modules and data stores included in the systems (e.g., 100, 102, 104) represent features that may be included in the systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components/devices.

Memory components may include (e.g., store) data described herein. For example, the memory components may include the data (e.g., book records) included in the data store 114. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems 100, 102, 104 may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems 100, 102, 104 may be configured to communicate with the network 112. The one or more computing devices of the systems 100, 102, 104 may also be configured to communicate with one another (e.g., via a computer network). In some examples, the one or more computing devices of the systems 100, 102, 104 may include one or more server computing devices configured to communicate with user devices (e.g., receive requests and transmit responses), gather data from data sources, index data, store the data, and store other documents. The one or more computing devices may reside within a single machine at a single geographic location in some examples. In other examples, the one or more computing devices may reside within multiple machines at a single geographic location. In still other examples, the one or more computing devices of the systems 100, 102, 104 may be distributed across a number of geographic locations.

What is claimed is:

1. A method comprising:
   retrieving, at a computing device, textual content and content reviews for a plurality of textual-content pieces;
   generating, at the computing device, style values for each of the plurality of textual-content pieces based on the retrieved textual content, wherein the style values for each textual-content piece indicate the style associated with text of the textual-content piece;
   generating, at the computing device, experiential language tags (ELTs) for each of the plurality of textual-content pieces based on the retrieved content reviews, wherein the ELTs for each textual-content piece indicate one or more experiences with the textual-content piece;
   generating, at the computing device, an ELT prediction model based on the style values and the ELTs for the plurality of textual-content pieces, wherein the ELT prediction model is configured to receive a set of style values for a new textual-content piece and output a set of predicted ELTs for the new textual-content piece, the set of predicted ELTs indicating predicted experiences with the new textual-content piece;
   receiving, at the computing device, user-submitted textual content from a remote user device;
   determining, at the computing device, style values for the user-submitted textual content;
   determining, at the computing device, a list of predicted ELTs for the user-submitted textual content using the style values for the user-submitted textual content and the ELT prediction model; and
   transmitting, to the user device, the list of predicted ELTs for the user-submitted textual content.

2. The method of claim 1, wherein the textual-content pieces include articles, and wherein the content reviews for the plurality of textual-content pieces include reader reviews.

3. The method of claim 1, wherein the textual-content pieces are associated with video content.

4. The method of claim 3, wherein the content reviews for the plurality of textual-content pieces include viewer reviews for the video content, and wherein the ELTs include one or more words describing qualities of the video content that create an experience for viewers of the video content.

5. The method of claim 4, wherein generating the ELTs for each of the plurality of textual-content pieces comprises:
   identifying words included in the viewer reviews that match words included in an ELT dictionary; and
   assigning the matching words in the ELT dictionary to the textual-content pieces.

6. The method of claim 3, wherein the textual-content pieces include scripts.

7. The method of claim 1, wherein the textual-content pieces are associated with audio content.

8. The method of claim 7, wherein the content reviews for the plurality of textual-content pieces include listener reviews for the audio content, and wherein the ELTs include one or more words describing qualities of the audio content that create an experience for the listeners of the audio content.

9. The method of claim 8, wherein generating the ELTs for each of the plurality of textual-content pieces comprises:
   identifying words included in the listener reviews for the textual-content pieces that match words included in an ELT dictionary; and
   assigning the matching words in the ELT dictionary to the textual-content pieces.

10. The method of claim 7, wherein the textual-content pieces include scripts.

11. A system comprising:
    a data store configured to store a plurality of records for a plurality of textual-content pieces; and
    one or more computing devices configured to:
      retrieve textual content and content reviews for the plurality of textual-content pieces;
      generate style values for each of the plurality of textual-content pieces based on the retrieved textual content, wherein the style values for each textual-content piece indicate the style associated with text of the textual-content piece;
      generate experiential language tags (ELTs) for each of the plurality of textual-content pieces based on the retrieved content reviews, wherein the ELTs for each textual-content piece indicate one or more experiences with the textual-content piece;
      generate an ELT prediction model based on the style values and the ELTs for the plurality of textual-content pieces, wherein the ELT prediction model is configured to receive a set of style values for a new textual-content piece and output a set of predicted ELTs for the new textual-content piece, the set of predicted ELTs indicating predicted experiences with the new textual-content piece;
      receive user-submitted textual content from a remote user device;
      determine style values for the user-submitted textual content;
      determine a list of predicted ELTs for the user-submitted textual content using the style values for the user-submitted textual content and the ELT prediction model; and
      transmit, to the user device, the list of predicted ELTs for the user-submitted textual content.

12. The system of claim 11, wherein the textual-content pieces include articles, and wherein the content reviews for the plurality of textual-content pieces include reader reviews.

13. The system of claim 11, wherein the textual-content pieces are associated with video content.

14. The system of claim 13, wherein the content reviews for the plurality of textual-content pieces include viewer reviews for the video content, and wherein the ELTs include one or more words describing qualities of the video content that create an experience for viewers of the video content.

15. The system of claim 14, wherein generating the ELTs for each of the plurality of textual-content pieces comprises:
    identifying words included in the viewer reviews that match words included in an ELT dictionary; and
    assigning the matching words in the ELT dictionary to the textual-content pieces.

16. The system of claim 13, wherein the textual-content pieces include scripts.

17. The system of claim 11, wherein the textual-content pieces are associated with audio content.

18. The system of claim 17, wherein the content reviews for the plurality of textual-content pieces include listener reviews for the audio content, and wherein the ELTs include one or more words describing qualities of the audio content that create an experience for the listeners of the audio content.

19. The system of claim 18, wherein generating the ELTs for each of the plurality of textual-content pieces comprises:
identifying words included in the listener reviews for the textual-content pieces that match words included in an ELT dictionary; and
assigning the matching words in the ELT dictionary to the textual-content pieces.

20. The system of claim 17, wherein the textual-content pieces include scripts.

* * * * *